United States Patent [19]

Veldhuis et al.

[11] Patent Number: 5,621,855

[45] Date of Patent: Apr. 15, 1997

[54] SUBBAND CODING OF A DIGITAL SIGNAL IN A STEREO INTENSITY MODE

[75] Inventors: Raymond N. J. Veldhuis; Robbert G. van der Waal; Leon M. van de Kerkhof, all of Eindhoven, Netherlands

[73] Assignee: U.S. Philips Corporation, New York, N.Y.

[21] Appl. No.: 326,145

[22] Filed: Oct. 19, 1994

Related U.S. Application Data

[63] Continuation of Ser. No. 829,789, Jan. 31, 1992, abandoned.

[30] Foreign Application Priority Data

Feb. 1, 1991 [NL] Netherlands ............................ 9100173

[51] Int. Cl.$^6$ ........................................................ G10L 3/02
[52] U.S. Cl. ......................................................... 395/2.38
[58] Field of Search ........................ 395/2, 2.1, 2.2–2.25, 395/2.33, 2.38, 2.39

[56] References Cited

U.S. PATENT DOCUMENTS

| | | | |
|---|---|---|---|
| 4,464,782 | 8/1984 | Baraud et al. | 395/2.33 |
| 4,464,783 | 8/1984 | Beraud et al. | 395/2.21 |
| 4,589,130 | 5/1986 | Galand | 395/2.38 |
| 4,896,362 | 1/1990 | Veldhuis et al. | 395/2.38 |
| 5,214,678 | 5/1993 | Rault et al. | 395/2.13 |
| 5,267,098 | 11/1993 | Lokhoff | 360/50 |
| 5,323,390 | 6/1994 | Pawelski | 370/63 |
| 5,323,396 | 6/1994 | Lokhoff | 370/94.1 |
| 5,365,553 | 11/1994 | Veldhuis et al. | 375/122 |
| 5,367,608 | 11/1994 | Veldhuis et al. | 395/2.38 |

FOREIGN PATENT DOCUMENTS

| | | | |
|---|---|---|---|
| 289080 | 2/1988 | European Pat. Off. | |
| 0400222 | 12/1990 | European Pat. Off. | H04B 1/66 |
| 9000338 | 1/1991 | Sweden | |
| 9000635 | 10/1991 | Sweden | |
| 9001127 | 12/1991 | Sweden | |
| 9001128 | 12/1991 | Sweden | |

OTHER PUBLICATIONS

EBU Techn. Review No. 230, Aug. 1988, G Theile et al, "Low bit rate coding of high–quality audio signals. An introduction to the MASCAM system", pp. 71–94.

Philips Journal of Research 44, pp. 329–343, 1989, R.N.J. Veldhuis et al. "Sub-band coding of digital audio signals".

IEEE ICASSP 80, vol. 1, pp. 327–331, Apr. 9–11, 1980, M.A. Krasner, "The critical band coder... Digital encloding of speech signals based on the perceptual requirements of the auditory system".

*Primary Examiner*—Allen R. MacDonald
*Assistant Examiner*—Thomas J. Onka
*Attorney, Agent, or Firm*—Richard A. Weiss

[57] ABSTRACT

Subband coding a digital signal having a first and a second signal component in a stereo intensity mode. The digital signal is subband coded to produce a first subband signal having a first q-sample signal block in response to the first signal component, and a second subband signal having a second q-sample signal block in response to the second signal component, the first and the second subband signals being in the same subband, and the first and second signal blocks being time-equivalent. The first and second signal blocks are processed to obtain a minimum distance value representative of a distance between a line and a plurality of points if (a) the points correspond to the respective pairs of time-equivalent samples in the first and second signal blocks, and are plotted in a coordinate system, and (b) the line is plotted such that it traverses the origin and the points at a minimum distance from the points in the coordinate system. When the minimum distance value is less than or equal to a threshold distance value, a composite signal block composed of q samples obtained by adding the respective pairs of time-equivalent samples in the first and second signal blocks together after multiplying each of the samples of the first signal block by $\cos(\alpha)$ and each of the samples of the second signal block by $-\sin(\alpha)$, where $\alpha$ is related to the angle formed between the line and a first axis of the coordinate system, are quantized.

56 Claims, 8 Drawing Sheets

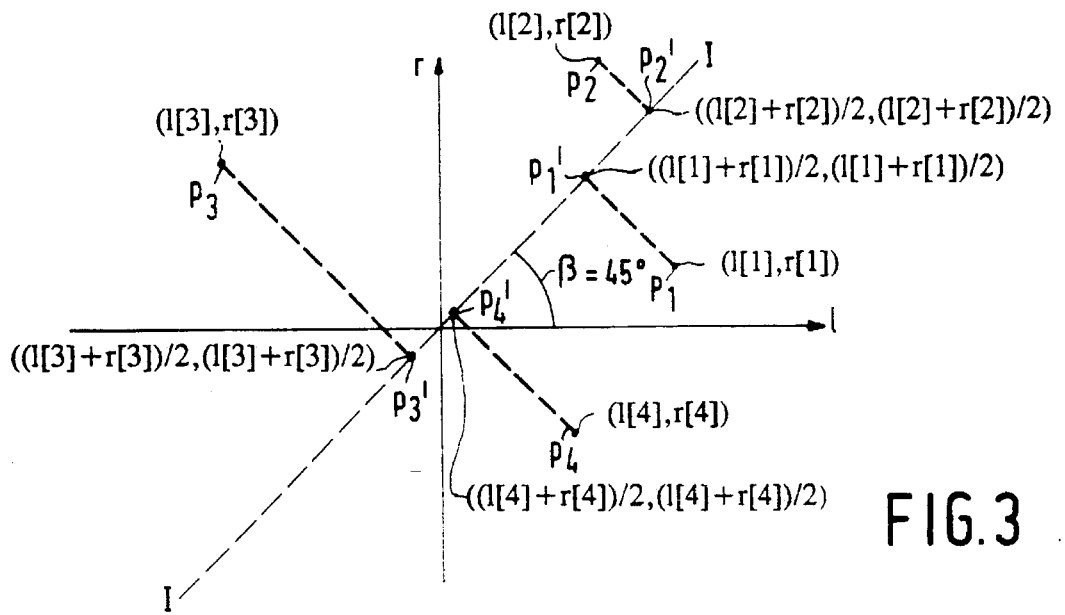
FIG.3
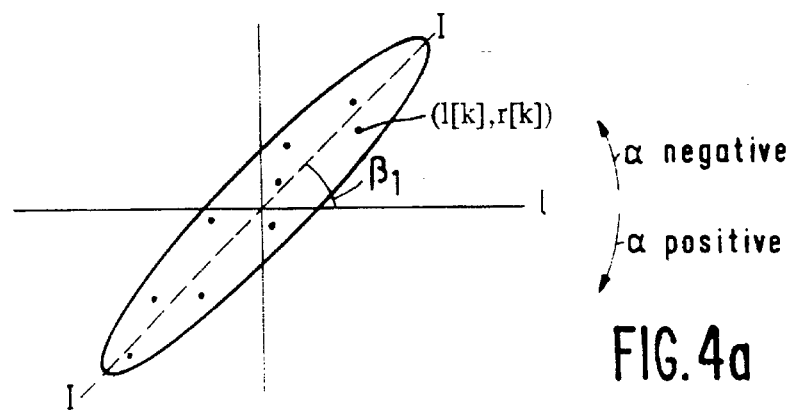
FIG.4a
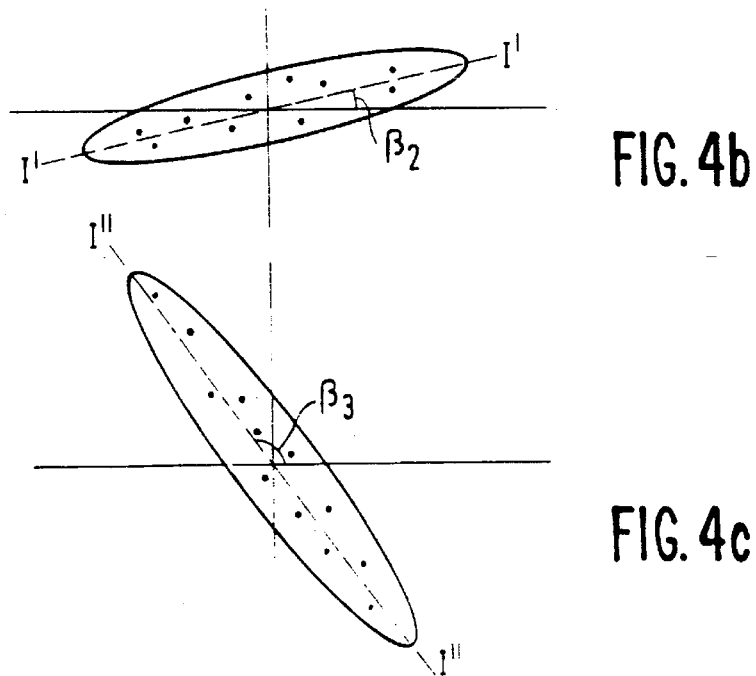
FIG.4b
FIG.4c

SUBBAND CODING OF A DIGITAL SIGNAL IN A STEREO INTENSITY MODE

This is a continuation of application Ser. No. 07/829,789 filed Jan. 31, 1992 now abandoned.

BACKGROUND OF THE INVENTION

The invention relates to coding systems for coding a wideband digital signal having first and second signal components (e.g., a wideband digital stereo signal having a left signal component and a right signal component) which each have a specific sampling frequency $F_s$. Such coding systems comprises a subband coding unit and a quantizing unit.

The subband coding unit (a) divides the bandwidth of the wideband digital signal into M successive subbands which augment with frequency, where M is a positive integer, and (b) generates (i) M first subband signals, in response to the first signal component, and (ii) M second subband signals, in response to the second signal component, such that a first subband signal of the first subband signals and a second subband signal of the second subband signals is in each of the subbands. Each of the first and second subband signals are composed of successive signal blocks of q samples of that respective subband signal, where q is a positive integer.

The quantizing unit either (a) quantizes a first signal block of the first subband signal and a second signal block of the second subband signal in a subband $SB_m$, where m is an integer such that $1 \leq m \leq M$, separately, the first and second signal blocks being time-equivalent, or (b) a composite signal block having q samples obtained by combining the first and the second signal blocks together. When the first and second signal blocks are quantized, each of the q samples in the first signal block are represented by $n_{ml}$ bits, and each of the q samples in the second signal block are represented by $n_{mr}$ bits. When the composite signal block is quantized, each of the q samples therein are represented by $n_{mc}$ bits.

The coding systems can also include a scale factor determining unit. The scale factor determining unit determines scale factor information relating to a scale factor $SF_l$ for the first signal block and a scale factor $SF_r$ for the second signal block.

The invention also relates to transmitters and transmitting and receiving systems which include the above-described coding system, and receivers for receiving the results of the above-described coding system. The transmitters and the transmitting and receiving systems are capable of transmitting the composite signal block and the scale factor information, and the receivers and the transmitting and receiving systems are capable of receiving the composite signal block and the scale factor information. Finally, the invention also relates to methods of performing the above-described coding.

A coding system of the type described in the opening paragraphs is known from Dutch Patent Application No. 90.00.338, to which U.S. Pat. No. 5,323,396 corresponds. The coding system described in Dutch Patent Application No. 90.00.338 enables coding of signal blocks of the first and second subband signals in some subbands in a so-called stereo intensity mode. That mode refers to the case in which a first signal block of the first subband signal and a second signal block of the second subband signal in a subband are combined to obtain a composite signal block, the first and second signal blocks which are combined being time-equivalent.

Coding in the stereo intensity mode is used when the waveform in the first and second subband signals (more particularly, the first and second signal blocks) in a subband are important, but the phase difference between those two is not important. This is the case for signals (i.e., signal blocks) in higher subbands because the human auditory system is less phase-sensitive to the frequencies in those subbands.

By implementing coding in the stereo intensity mode, a smaller information content is available for transmission (of the composite signal block representing the first and second signal blocks) than when the first and second signal blocks are coded separately, assuming the same coding accuracy. The size of the information content will be dependent on the accuracy of the coding. Better accuracy requires a large information content and vice-a-versa.

When a transmitter and/or transmitting and receiving system utilize the stereo intensity mode for coding, the composite signal block and the scale factor information relating to the scale factors for each of the first and second signal blocks (used in creating the composite signal block) are transmitted. A receiver than multiplies the samples in the composite signal block by each of those scale factors separately to obtain replicas of each of the first and second signal blocks. As a result, the respective pairs of time-equivalent samples in each of the first and second signal block replicas will differ from one another in the same manner as their scale factors differ.

The coding system described in Dutch Patent Application No. 90.00,338 is disadvantageous in that coding in the stereo intensity mode does not provide good signal transmission results. In particular, a decoded signal may have some distortion.

SUMMARY OF THE INVENTION

It is an object of the invention to provide a coding system in which good signal transmission results can be obtained when utilizing stereo intensity mode coding. This object is achieved by the coding system described in the opening paragraphs comprising a control unit for: (a) processing the first and second signal blocks to obtain a minimum distance value representative of a distance between a line and a plurality of points if (i) the points correspond to the respective pairs of time-equivalent samples in the first signal block and the second signal block and are plotted in a coordinate system having a first axis and a second axis intersecting at an origin such that each of the points has a location along the first axis dictated by the sample from the first signal block for that point and at a location along the second axis dictated by the sample from the second signal block for that point, and (ii) the line is plotted such that it traverses the origin and the points at a minimum distance from the points in the coordinate system; and (b) when the minimum distance value is less than or equal to a threshold distance value, (i) generating a control signal and (ii) determining a value $\beta$ which is representative of an angle formed between the line and the first axis if the points and the line are plotted. In addition, the quantizing unit of the coding system in accordance with the invention is characterized in that it quantizes a composite signal block composed of q samples obtained by adding the respective pairs of time-equivalent samples in the first and second signal blocks together after multiplying each of the samples of the first signal block by $\cos(\alpha)$ and each of the samples of the second signal block by $-\sin(\alpha)$, where $\alpha$ is determined based on $\beta$, when the control signal is generated.

The invention is based on recognizing that coding in the stereo intensity mode in accordance with the coding system described in Dutch Patent Application No. 90.00,338 essentially involves providing information about distances from an origin of a l–r coordinate system of projections of points (i.e., a cloud of points) along a line traversing the origin of the l–r coordinate system at an angle of 45°, the points corresponding to respective pairs of time-equivalent samples l[k] and r[k] in the respective time-equivalent first and second signal blocks plotted in the l–r coordinate system, where each point (l[k],r[k]) is located along the l-axis in accordance with the amplitude of sample l[k] and the r-axis in accordance with the amplitude of the sample r[k]. That information is provided as the samples in the composite signal block. Such coding works out favorably when the cloud of points are essentially located in the first and third quadrants of the l–r coordinate system, but not so favorably when the cloud of points are located in the second and fourth quadrants.

The invention involves determining a projection line as a function of the location of the cloud of points so that the projection line traverses the cloud of points in the most advantageous way. Subsequently the points are projected on that projection line. The distance between those projections, measured from the origin, are used as samples, inclusive of their signs, of the composite signal block. The result of coding in this fashion is that better transmission is realized.

In one embodiment of the invention, $\alpha$ can be made equal $-\beta$. As a result, one of the scale factors may be negative. Hence, when the composite signal block and the scale factors for the first and second signal blocks (used to obtain the composite signal block) are transmitted, a sign bit for one of the scale factors will also need to be transmitted. The need to transmit the additional signal bit may prohibit use of the signal transmission format described in Dutch Patent No. 90.00,338.

One way to eliminate the need for the sign bit (and as such allow the format described in Dutch Patent Application No. 90.00,338 to be used when the composite signal block and the scale factors for the first and second signal blocks are transmitted) is to make $\beta$ equal to the following in the following situations: (a) if $\beta$ satisfies a condition $0 \leq \beta \leq 90°$, $\alpha=-\beta$; (b) if $\beta$ satisfies a condition $90°<\beta<135°$, $\alpha=-90°$; and (c) if $\beta$ satisfies a condition $-45°<\beta<0°$, $\alpha=0°$. What this means is that if the cloud of points corresponding to the respective pairs of time-equivalent samples l[k] and r[k] in the respective time-equivalent first and second signal blocks are located in the first and third quadrants the points are projected in the manner described above, and so is the coding. If, however, the cloud of points corresponding to the respective pairs of time-equivalent samples l[k] and r[k] in the respective time-equivalent first and second signal blocks are located in the second and fourth quadrants, it holds that the points are projected on either the l-axis if $90°<\beta<135°$, or the r-axis if $-45°<\beta<0°$, and the distances between those projections on those axes are used as the samples of the composite signal block. Since projections are made on the l-axis or the r-axis, in this latter case, a sign bit becomes unnecessary, i.e., it would be redundant. In addition, because projections made on the l-axis or the r-axis provide for a better approximation of the time-equivalent samples than if the projections were made on a line traversing the origin of the coordinate system at an angle of 45°, better transmission of the composite signal block will occur.

The scale factors $SF_l$ and $SF_r$ may be obtained in various ways in conjunction with the invention. First, those scale factors can be derived from the first and second signal blocks in a manner known to person skilled in the art. Second, those scale factors can be derived from a scale factor $SF_{lr}$ for the composite signal block.

In accordance with one embodiment of the invention, the coding system in accordance with the invention is characterized in that it further comprises a scale factor determining unit for determining the composite scale factor $SF_{lr}$ for the composite signal block, the composite scale factor $SF_{lr}$ being determined from a sample therein having a maximum absolute value amplitude. In a further embodiment, the scale factor determining unit comprises: (a) a first multiplying unit for multiplying the composite scale factor $SF_{lr}$ by $\cos(\alpha)$ to obtain the scale factor $SF_l$ for the first signal block; and (b) a second multiplying unit for multiplying the composite scale factor value by $-\sin(\alpha)$ to obtain the scale factor $SF_r$ for the second signal block.

When the embodiment just described is incorporated in to a transmitter or a transmitting and receiving system (on the transmitter side), the scale factors $SF_l$ and $SF_r$ can be obtained by that unit and then transmitted via a transmission medium. However, if the first part of the scale factor determining unit mentioned above (i.e., part which determines the composite scale factor $SF_{lr}$) is included in a transmitter or in the transmitter side of a transmitting and receiving system, and the second part thereof (i.e., the part which determines the scale factors $SF_l$ and $SF_r$) is included in a receiver or in the receiver side of a transmitting and receiving system, the scale factor $SF_{lr}$ and the angle $\alpha$ can be transmitted by the transmitter or transmitter side of the transmission and receiving system, and the receiver or receiver side of the transmitting and receiving system can, in turn, derive the scale factors $SF_l$ and $SF_r$ on the basis of the scale factor $SF_{lr}$ and $\alpha$.

In another embodiment of the invention, the scale factor determining unit which determines the composite scale factor $SF_{lr}$ is adapted to determine the scale factor $SF_l$ or $SF_r$ for either the first or the second block in accordance with the following relationship:

$$SF_{lr}\sqrt{\frac{S_{12}}{S_c}}$$

where $SF_{lr}$ is the composite scale factor, $S_{12}$ is the sum of the squares of the amplitudes of the samples in the first or second signal block and $S_c$ is the sum of the squares of the amplitudes in the composite signal block. This embodiment can also be implemented in a coding system employing the stereo intensity mode in accordance with the prior art.

In still another embodiment of the invention, the coding system is characterized in that it further includes a scale factor determining unit comprising: (a) a second quantizing unit for quantizing the scale factors $SF_l$ and/or $SF_r$; (b) a dequantizing unit for dequantizing (i) the scale factor $SF_l$ to obtain a dequantized first scale factor and/or (ii) scale factor $SF_r$ to obtain a dequantized second scale factor; and a dividing unit for dividing (i) the dequantized first scale factor by the scale factor $SF_l$ and/or (ii) the dequantized second scale factor by the scale factor $SF_r$ to obtain a coefficient based thereon; and the quantizing unit comprises a multiplying unit for multiplying each of the samples of the composite signal block by the coefficient. This embodiment can also be employed in a coding system employing the stereo intensity mode in accordance with the prior art.

BRIEF DESCRIPTION OF THE DRAWING

The invention will now be explained in detail in accordance with the following drawing, in which:

FIG. 3 shows points corresponding to respective pairs of time-equivalent samples in respective first and second signal blocks of respective first and second subband signals in a subband in accordance with a prior-art stereo intensity coding;

FIGS. 4a–c and 5 show points corresponding to respective pairs of time-equivalent samples in respective first and second signal blocks of respective first and second subband signals in a subband and manipulation of those points in accordance with the stereo intensity coding according to the invention;

FIGS. 6b, 6c and 6d show three exemplary embodiments of receivers for decoding the signals coded in the coding system shown in FIG. 6a;

DESCRIPTION OF THE PREFERRED EMBODIMENT

Figure 1:
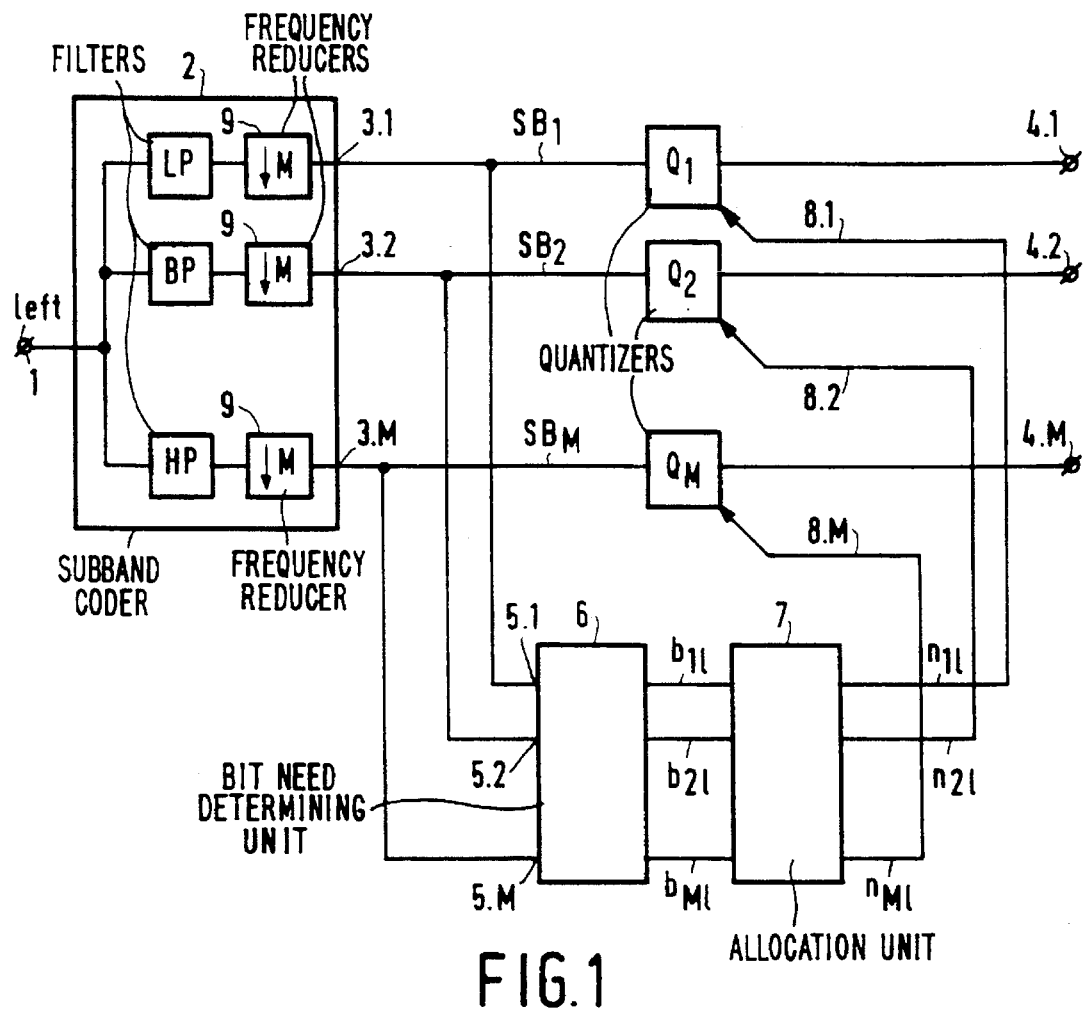
FIG. 1 shows a coding system.

FIG. 1 shows a coding system. A wideband digital signal is applied to the input terminal 1. Such a wideband digital signal may be an audio signal having a bandwidth of about 20 kHz. The audio signal may, in turn, be a stereo audio signal. For such a case, the discussion which follows primarily addresses only one of the two signal components (i.e., the left or right signal component) of the stereo audio signal. For example, it may be assumed that 16-bit samples of the left signal component of an audio signal having a sampling frequency of 44 kHz are applied to the input terminal 1. Nevertheless, that which occurs with one of the signal components occurs with the other signal component as well.

The audio signal (for the left signal component, for example) is applied to a subband coder 2 which comprises a signal splitting unit. The signal splitting unit splits up the audio signal into M subband signals, each of which is within one of M subbands of the bandwidth of the audio signal by means of M filters, i.e., a low-pass filter LP, M-2 band-pass filters BP, . . . , and a high-pass filter HP. For example, M may be equal to 32. The sampling frequencies of the M subband signals are then reduced in the blocks referenced 9. The sampling frequencies are reduced therein by a factor of M.

The subband signals are available at the outputs 3.1, 3.2, . . . 3.M of the subband coder 2. The subband signal in the lowest subband $SB_1$ is available at output 3.1. The subband signal in the second to lowest subband $SB_2$ is available at output 3.2. The subband signal in the highest subband $SB_M$ is available at the output 3.M.

Figure 1A:
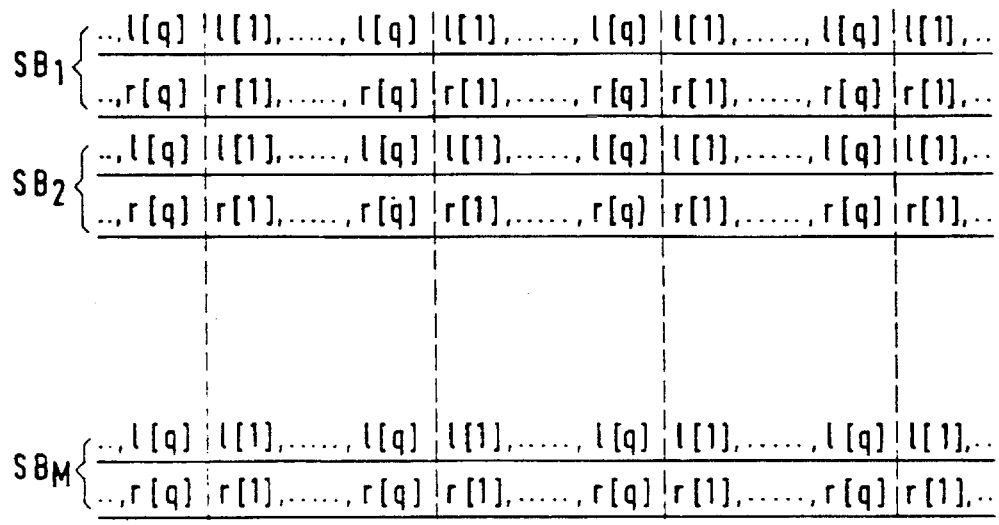
FIG. 1a shows samples of subband signals (in subbands) derived from the left and right signal components of a stereo signal.

The subband signals available at the outputs 3.1 to 3.M have the form of successive samples expressed in 16 or more bit numbers for example, 24. Thus, the samples of the subband signals obtained from the left signal component appear at the outputs 3.1 to 3.M of FIG. 1. These samples of those subband signals are referenced l[k] and are shown in FIG. 1a. A subband coding system for the right signal component of the audio signal similarly produces samples r[k] of subband signals from the right signal component in the subbands $SB_1$ to $SB_M$. These samples of those subband symbols are shown in FIG. 1a as well. The subband signals are each made up of successive signal blocks of q successive samples. See FIG. 1a. q may be equal to 12.

In the present exemplary embodiment, the subbands $SB_1$ to $SB_M$ all have the same width. This is not necessary, however. An article by M. A. Krasner entitled "The Critical Band Coder . . . of Digital Encoding of Speech Signals Based on Perceptual Requirements of the Auditory System." IEEE ICASSP 80, Vol. 1, pg. 327–331, Apr. 9–11, 1980, discusses, for example, a subdivision into a number of subbands whose bandwidths approximately correspond to the bandwidths of the critical bands of the human auditory system in the respective frequency ranges.

The operation of the subband coder 2 will not be further discussed herein because the operation thereof has already been extensively discussed. To this end reference is made to the above-mentioned Krasner article and European Patent Application Nos. 289,080 and 89.201.408.5 (to which) U.S. Pat. Nos. 4,896,386 and 5,214,678 correspond) which are incorporated herein by reference.

The successive signal blocks of q successive samples of each of the subband signals are applied to associated quantizers $Q_1$ to $Q_M$, respectively. In a quantizer $Q_m$ the samples of a subband signal are quantized to provide quantized samples having a number of bits $n_m$, which is smaller than 16.

FIG. 1 shows how each of the subband signals obtained from the left signal component, for example, are applied to an associated quantizer $Q_m$ in signal blocks of q successive samples, i.e., the samples l[1] to l[q]. In a similar fashion each of the subband signals obtained from the right signal component is applied to an associated quantizer (not shown) in signal blocks of q successive samples, i.e., the samples r[1] to r[q]. During quantization, the signal blocks (groups) of q successive samples of the subband signals are each quantized to a smaller number of bits.

Prior to quantization, the q samples in each signal block are first normalized. This normalization is effected by dividing the amplitudes of the q samples in a signal block by the amplitude of the sample having the largest absolute value in that signal block. The amplitude of the sample having the largest amplitude in a signal block of a subband signal in the subband $SB_m$ provides the scale factor $SF_m$ for that signal block. For reference, see Dutch Patent Application No. 90.00.338. Subsequently, the amplitudes of the normalized samples, which are now situated in an amplitude range from −1 to +1, are quantized. The quantized samples of the subband signals in the subbands $SB_1$ to $SB_M$ are thereafter presented at the respective outputs 4.1 to 4.M.

The outputs 3.1 to 3.M of the subband coder 2 are further coupled to the respective inputs 5.1 to 5.M of a bit need determining unit 6. The bit need determining unit 6 determines the bit need $b_{ml}$ for each of the q-sample signal blocks corresponding in time, i.e., time-equivalent signal blocks, obtained from the left signal component in the subbands $SB_1$ to $SB_M$. A bit need $b_{mr}$ for each of the time-equivalent q-sample signal blocks obtained from the right signal component in the subbands $SB_1$ to $SB_M$ is also obtained by the bit need determining unit 6 (or a similar unit). The bit needs $b_{ml}$ and $b_{mr}$ are numbers related to the number of bits with the q samples in a q-sample signal block of a subband signal from the left and right signal components, respectively in the subband m ought to be quantized.

The bit needs $b_{1l}$ to $b_{ml}$ (and/or $b_{1r}$ to $b_{Mr}$) derived by the bit need determining unit 6 are applied to a bit allocation unit 7. The bit allocation unit 7 determines, on the basis of the bit needs $b_{1l}$ to $b_{m1}$ (and/or $b_{1r}$ to $b_{Mr}$), the real number of bits $n_{1l}$ to $n_{Ml}$ (and/or $n_{1r}$ to $n_{Mr}$) with each of the q samples of the time equivalent signal blocks in the subband signals $SB_1$ to $SB_M$ obtained from the left (and/or right) signal component(s) are quantized, respectively. Control signals corresponding to the numbers $n_{1l}$ to $n_{Ml}$ are applied to the respective quantizers $Q_1$ to $Q_M$ over the lines 8.1 to 8.M, so that the quantizers are capable of quantizing the samples with the correct numbers of bits. Similarly, control signals corresponding to the numbers $n_{1r}$ to $n_{Mr}$ are applied to associated quantizers (not shown) for the right signal component, so that also these quantizers are capable of quantizing the samples obtained from the right signal components with the correct numbers of bits.

Dutch Patent Application Nos. 90.01.127 and 90.01.128, to which U.S. Pat. Nos. 4,367,608 and 5,365,553 correspond extensively discuss how the bit need determining unit 6 and the bit allocation unit 7 may function.

Dutch Patent Application No. 90.00.338, describes how in a stereo intensity mode the signals obtained from the left and right signal components in a subband are combined in one or more subbands. See in particular the description related to FIG. 15c.

Figure 2A:
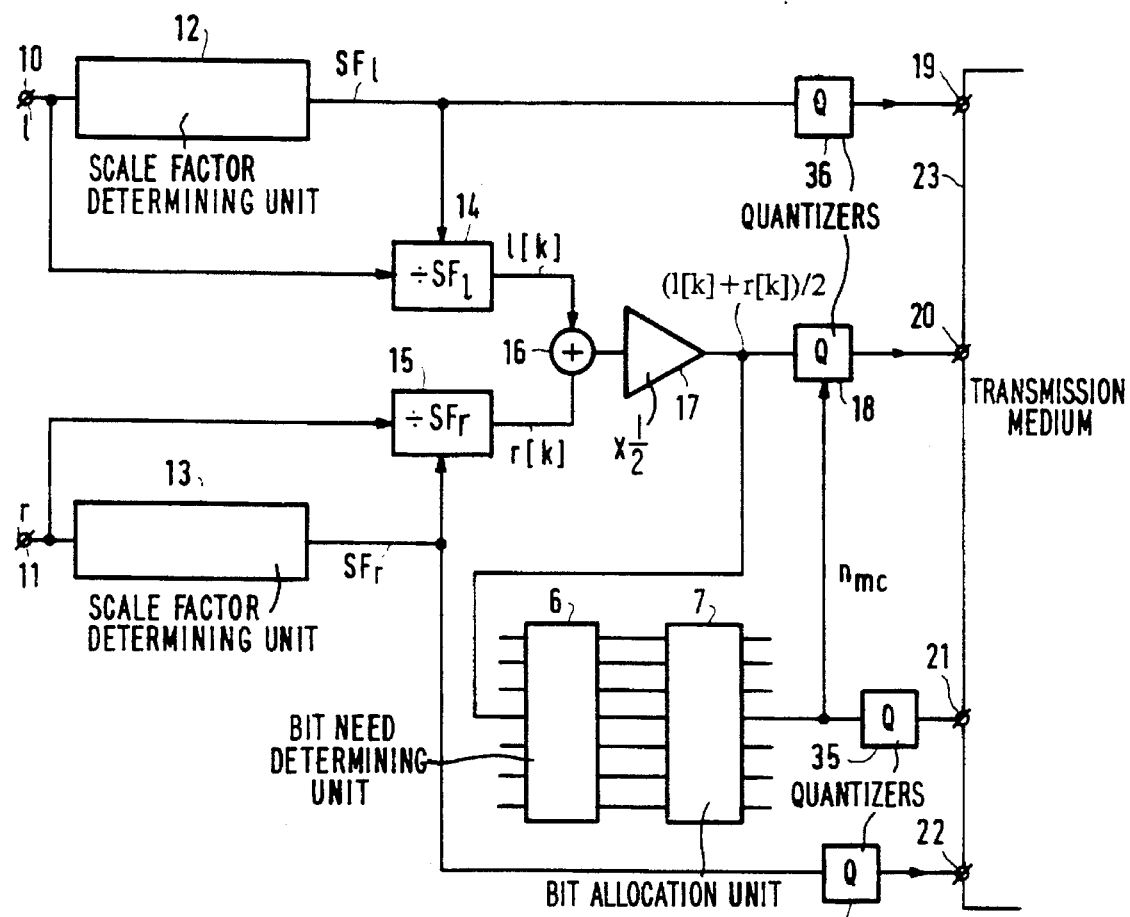
FIG. 2a shows a prior-art stereo intensity coding in the coding system shown in FIG. 1

FIG. 2a shows the structure of the part of the coding system in Dutch Patent Application No. 90.00.338 which performs a stereo intensity coding of the subband signals obtained from the left and the right signal components in a subband $SB_m$. The input terminal 10 is constantly supplied with q-sample signal blocks of a first subband signal, i.e., the subband signal obtained from the left signal component in the subband $SB_m$ (that subband signal hereinafter being referred to as a left subband signal component). The input terminal 11 is constantly supplied with q-sample signal blocks of a second subband signal, i.e., the subband signal obtained from the right signal component in the subband $SB_m$ (that subband signal hereinafter being referred to as a right subband signal component).

The left subband signal component, referenced 1, is applied both to a scale factor determining unit 12 and a divider 14. In the scale factor determining unit 12, a scale factor $SF_l$ is determined for each signal block in the left subband signal component. This scale factor is equal to, for example, the amplitude of the largest sample in the signal block. In the divider 14, all of the samples of the signal block are divided by the scale factor $SF_l$. The output of the divider 14 then presents normalized samples referenced l[k], where k varies from 1 to q. The samples l[k] are applied to a first input of a signal combining unit 16 formed by an adder.

The right subband signal component, referenced r, is applied to a scale factor determining unit 13 and to a divider 15. In the scale factor determining unit 13, a scale factor $SF_r$ is determined for each signal block in the right subband signal component. This scale factor is also equal to the amplitude of the largest sample of the signal block. In the divider, 15 all of the samples in the signal block are divided by the scale factor $SF_r$. The output of the divider 15 then presents normalized samples r[k], where K varies from 1 to q which are applied to a second input of the signal combining unit 16.

In an additional divider 17 the summed samples l[k]+r[k] are divided by 2. The samples obtained from divider 7, making up q-sample signal blocks of a composite subband signal in subband $SB_m$, are applied to a quantizer 18 and to a bit need determining unit 6.

The bit need determining 6 is coupled to a bit allocation unit 7, and together they determine, in the manner described, for example, in the Dutch Patent Application Nos. 90.01,127 and 90.01,128, the number of bits $n_{mc}$ by which each of the samples in a signal block of the composite subband signal in the subband $SB_m$ are to be represented. The samples in the signal block of the composite subband signal are quantized in a quantizer 18 and then applied to an input 20 of a transmission medium 23. Similarly, the scale factors $SF_l$ and $SF_r$ belonging to the corresponding signal blocks of the left and right subband signal components are applied, after quantization in the quantizers 36 and 37, respectively, to the respective inputs 19 and 22 of the transmission medium 23. Finally, the allocation information $n_{mc}$, denoting the number of bits by which each of the quantized samples in the signal block of the composite subband signal are represented by, are applied, subsequent to quantization in the quantizer 35, to an input 21 of the transmission medium 23. The method described above is constantly repeated for successive time-equivalent signal blocks of the left and right signal components in the subband $SB_m$.

The transmission medium 23 may have the form of a wireless transmission medium, such as, for example, a radio transmit channel. However, other transmission media are also possible. One may think of optical transmission, for example, through optical fibres or optical record carriers, such as, compact disc-like media, or transmission by means of magnetic record carriers utilizing, for example, RDAT or SDAT-like recording or reproducing techniques as described, for example,in Dutch Patent Application No. 90.00.635 (to which in U.S. Pat. No. 5,267,098 corresponds) which is incorporated herein by reference.

Figure 2B:
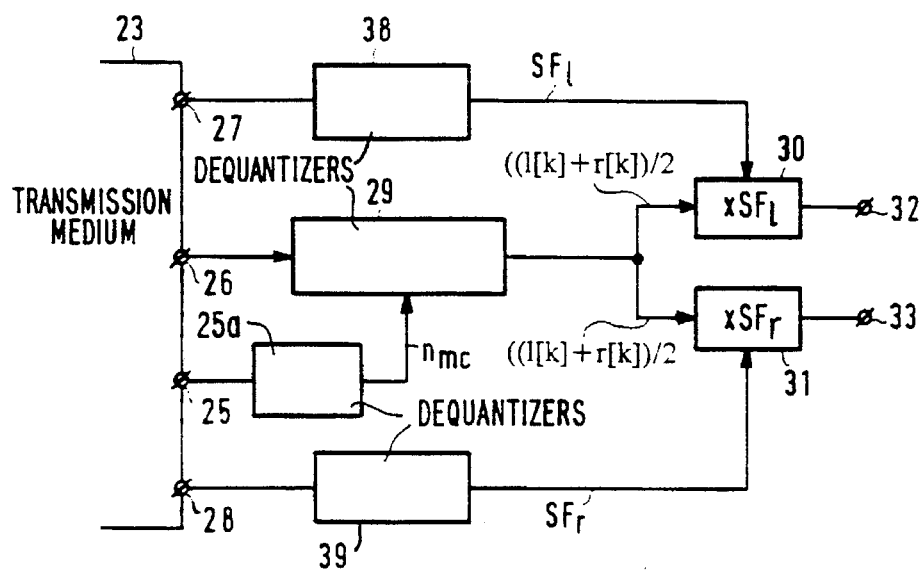
FIG. 2b shows the corresponding decoding thereof.

At the receiver end of the transmission medium 23, see FIG. 2b, each of the q-sample signal blocks of the composite subband signal in the subband $SB_m$ is derived from the data stream of the quantized samples applied to a dequantizer 29 through an input 26 in response to the allocation information $n_{mc}$ for that signal block, also applied to the dequantizer 29 via an input 25 and a dequantizer 25a. This method is extensively discussed in Dutch Patent Application No. 90.00,338. The samples, thus obtained, are then applied to multipliers 30 and 31. The scale factors $SF_l$ and $SF_r$ belonging to the corresponding signal blocks of the left components and right subband signal scale factors for each of the signal blocks of the composite signal in subband are also derived from the data stream sent to the receiver via the transmission medium 23. The scale factors $SF_l$ and $SF_r$ are also applied to the multipliers 30 and 31 through the inputs 27 and 28, respectively. The samples in each of the signal blocks of the composite subband signal are multiplied by the corresponding scale factors $SF_l$ and $SF_r$ for that signal block, respectively, in the multipliers 30 and 31, respectively. The outputs 32 and 33 then provide the left and right subband signal components, respectively, in the subband $SB_m$.

The consequences of the stereo intensity coding at the transmitter end and the corresponding decoding at the receiver end will be explained with reference to FIG. 3. Time-equivalent samples l[k] and r[k] in time-equivalent signal blocks of the left and right subband signal components may be and are plotted together as points in a plane formed by a coordinate system in FIG. 3, the amplitude of sample l[k] being plotted along one axis of the coordinate system and the amplitude of sample r[k] being plotted along the other axis. $P_1$, $P_2$, $P_3$ and $P_4$ in FIG. 3 denote four points corresponding to the first four pairs of time-equivalent samples (l[1],r[1]), (l[2],r[2]), (l[3],r[3]) and (l[4],r[4]) from time-equivalent signal blocks of the left and right subband signal components in the subband $SB_m$.

In stereo intensity coding, time-equivalent samples l[k] and r[k] from time-equivalent signal blocks, of the left and right subband signal components in the subband $SB_m$ are added together in an adder 16 of FIG. 2a to become composite samples l[k]+r[k], divided by two in the divider 17 of FIG. 2a and transmitted via the transmission medium 23 after being quantized in the quantizer 18 of FIG. 2a. At the receiver end, after dequantization, the composite samples are applied to both multipliers 30 and 31 of FIG. 2b to provide the time-equivalent samples, l[k] and r[k].

The composite samples applied to the multipliers 30 and 31 may also be and are plotted together as points in the plane shown in FIG. 3, the amplitude of the sample applied to the multiplier 30 being plotted along the l-axis and the amplitude of the sample applied to the multiplier 31 being plotted along the r-axis. Points $P_1'$, $P_2'$, $P_3'$ and $P_4'$ denote four points having the coordinates ((l[k]+r[k])/2, (l[k]+r[k])/2), where k varies from 1 to q. All of these points are plotted on a dashed line I—I which traverses the origin of the coordinate system at an angle $\beta$ relative to the l-axis equal to 45°.

What FIG. 3 makes apparent is that the coding of a time-equivalent sample pair l[k],r[k] (from time-equivalent signal blocks of the left and right subband signal components in the subband $SB_m$) to obtain a composite sample and the subsequent decoding of that composite sample narrows down to a projection of the point (l[k],r[k]) on the dashed line I—I in FIG. 3. For the time-equivalent sample pairs corresponding to the points $P_1$ and $P_2$, the coding and subsequent decoding does not cause any difficulties. This is because the amplitudes of the composite samples obtained for those pairs of time-equivalent samples are relatively large compared to a specific noise level. The time-equivalent sample pairs corresponding to the points $P_3$ and $P_4$ are obtained from time-equivalent samples l[k] and r[k] which also have relatively large amplitudes compared to the noise level. FIG. 3 shows, however, that the projections of these points on the dashed line lead to composite samples having relatively small amplitudes. Those amplitudes may be so small as to be of the order of the noise level. The multiplication of those composite samples in the multipliers 30 and 31 produces reconstructed time-equivalent samples $l_r[k]$ and $r_r[k]$ which have a poor signal-to-noise ratio and, thus, are unreliable.

Therefore, it has to be concluded that there are situations in which there is good transmission and situations in which there is poor transmission of stereo intensity coded samples. Good transmission is effected if the time-equivalent samples from two corresponding time-equivalent signal blocks of the left and right subband signal components in a subband lead to q points $P_k$ ($P_k$=(l[k],r[k])) situated in a cloud of points traversed by the dashed line I—I. Such a situation is shown in FIG. 4a. Projections on that line lead to composite samples having amplitudes which are mostly of the same order of magnitude as the amplitudes of the original samples. FIG. 4c shows a situation in which the coding and subsequent decoding lead to a poor transmission with too much noise being introduced. The cloud of the q points $P_k$ ($P_k$=(l[k],r[k])) does not coincide with the line I—I, rather, it is more or less perpendicular to that line. As a result, projections on the line I—I lead to composite samples having amplitudes which are in most cases very small relative to the amplitudes of the original samples. Generally, from this, it can be concluded that when the line I—I does not optimally traverse the cloud of points, the stereo intensity coding as described above does not lead to good transmission.

To realize good transmission for situations in which the cloud of points is not traversed by the line I—I, a coding system is proposed according to the invention in which a projection is made on a line traversing the cloud of points in the best way possible depending on the position of the cloud of points. This is shown in FIGS. 4a–c. FIG. 4a shows the situation in which a q-point cloud of points is optimally traversed by the line I—I which is at an angle $\beta_1$ relative to the l—axis equal to 45°. FIG. 4b shows the situation in which the q-point cloud of points is optimally traversed by a line I'—I' which is at an angle $\beta_2$ relative to the l-axis which is smaller than 45°. FIG. 4c shows a q-point cloud of points which is optimally traversed by a line I"—I" which is at an angle $\beta_3$ which is about 135°.

Projections on the lines I—I, I'—I' and I"—I" can be performed by a rotation transformation for the q points (l[k],r[k]) so that the l-axis coincides with the relevant line I—I, I'I' or I"—I". As a result of this transformation, the points (l[k],r[k]) in the l–r plane of FIGS. 3 and 4 are transformed to the points in an I–E plane as shown in FIG. 5, i.e., according to the following relationship:

$$\begin{pmatrix} I[k] \\ E[k] \end{pmatrix} = \begin{pmatrix} \cos\alpha & -\sin\alpha \\ \sin\alpha & \cos\alpha \end{pmatrix} \begin{pmatrix} l[k] \\ r[k] \end{pmatrix} \quad \text{Eq. 1}$$

For $\alpha$ it holds that $-\pi/2 < \alpha \leq \pi/2$.

Figure 5:
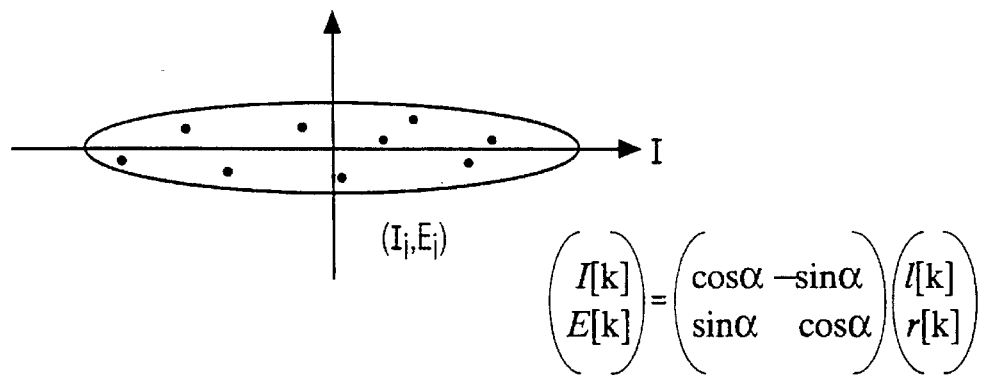

FIG. 5 shows a cloud of points from one of the FIGS. 4a, 4b and 4c after transformation to the I-E coordinate system according to the above rotation transformation. The l-axis, after rotation, coincides with the I-axis, and the r-axis, after rotation, coincides with the E-axis. The transformation of the cloud of points in FIG. 4a, for example, to the cloud of points in FIG. 5 involves a rotation through an angle $\alpha$ equal to $-\beta_1$. The transformation of the cloud of points in FIG. 4b, for example, to FIG. 5 involves a rotation through an angle $\alpha$ equal to $-\beta_2$. The transformation of the cloud of points of FIG. 4c, for example, to FIG. 5 involves a rotation through an angle $\alpha$ equal to $-\beta_3$.

As a result of the rotation, the coding at the transmitter end, which was based according to the known method on the projections of the points (l[k],r[k]) on the line I—I in the l-r coordinate system, see FIG. 3, is now transformed to a coding in the form of projections of the points (I[k],E[k]) on the I-axis in the I–E coordinate system of FIG. 5. According to the invention only the projections of the points (I[k],E[k]) on the I-axis are transmitted via the transmission medium. This means that q samples I[k] in a signal block of a composite subband signal are transmitted. The I-axis in FIG. 5 is in actuality an intensity axis and the E-axis is an error axis. The angle $\alpha$ is selected such that $$\sum_{k=1}^{q} E^2[k] \qquad \text{Eq. 2}$$

is minimized.

In the system according to the invention, the time-equivalent signal blocks of the left and right subband signal components in a subband are encoded in the stereo intensity mode if the values E[k] obtained after rotation are small enough. This actually means that the error in the intensity coding is to be smaller than a specific value. If the error is too large, the time-equivalent signal blocks are not encoded in the stereo intensity mode, but rather the normal coding system as described in Dutch Patent Application Nos. 90.01.127 and 90.01.128 is performed separately on the time-equivalent signal blocks of the left and right subband signal components of a subband. Another possibility is that in that case both E[k] and I[k] are transmitted. Possible decision criterions for switching the stereo intensity mode on or off are to be discussed at some later instant.

Figure 6A:
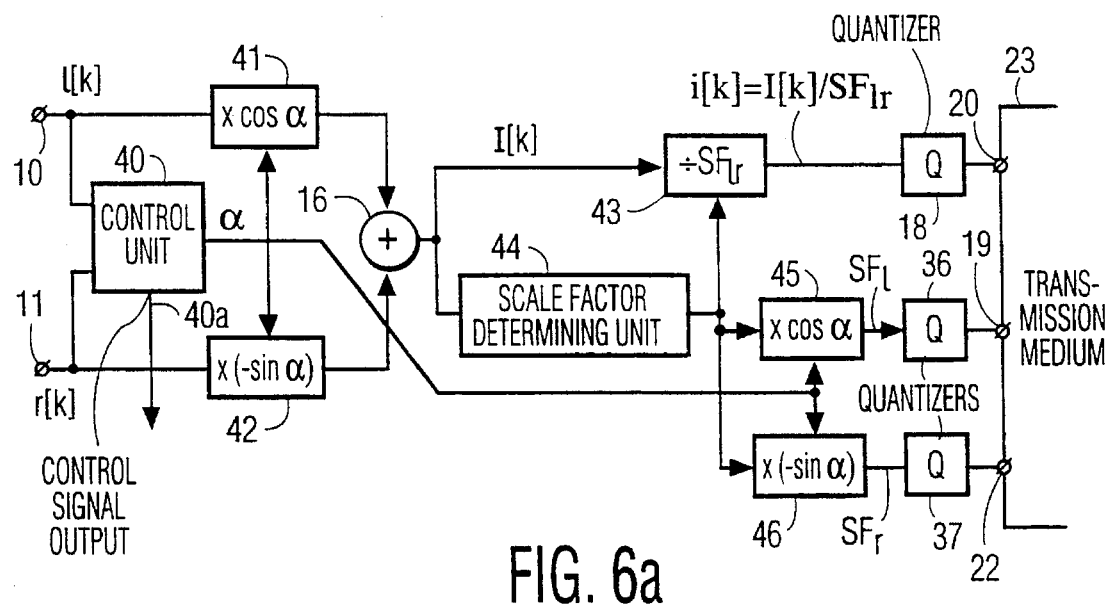
FIG. 6a shows a section of the coding system shown in FIG. 1 which is capable of performing the stereo intensity coding according to the invention.

FIG. 6a shows the transmitter side of an exemplary embodiment of a system according to the invention which is able to code the left and right subband signal components in a subband in the stereo intensity mode in accordance with the invention. Inputs 10 and 11 are supplied with the samples l[k] and r[k] of time-equivalent signal blocks of the left and right subband signal components, respectively. The samples l[k] and r[k] in respective signal blocks need not first be divided by the scale factors $SF_1$ and $SF_r$, respectively, as was the case in the system shown in FIG. 2.

The samples l[k] are applied to a control unit 40 and a multiplier 41. The samples r[k] are also applied to the control unit 40 and to a multiplier 42.

The control unit 40 determines, on the basis of the criterion to be discussed hereinafter, whether a set of time-equivalent signal blocks of the left and right subband signal components of a subband can be coded in the stereo intensity mode. If so, a control signal is generated at output 40a of the control unit 40. This control signal cause the coding system to carry out a stereo intensity coding of the time-equivalent signal blocks of the left and right subband signal components in a subband, instead of a separate encoding of each of those signal blocks. Further, the control unit 40 derives an angle $\alpha$ from the samples l[1] to l[q] and r[1] to r[q] in the respective time-equivalent signal blocks in the fashion described above. Specifically, the control unit 40 determines the angle $\beta$ of the lines I—I, I'—I' and I"—I" in FIGS. 4a–c.

Within a certain quantization accuracy range, $\alpha$ is equal to $-\beta$. For the lines located in the first and third quadrants of the l–r coordinate system shown in FIGS. 4a–c, such as the lines I—I and I'—I' in FIGS. 4a and 4b, $\alpha$ has a negative value. For lines located in the second and fourth quadrants, such as the line I"—I" in FIG. 4c, $\alpha$ is positive, i.e., equal to $\pi-\beta_3$ in the example shown in FIG. 4c.

The control unit 40 presents the value for $\alpha$ at an output thereof to be applied to multipliers 41 and 42. In the multiplier 41, the samples l[1] to l[q] of a signal block are multiplied by cos, and in the multiplier 42, the samples r[1] to r[q] of a signal block are multiplied by $-\sin\alpha$. Outputs of the multipliers 41 and 42 are coupled to respective inputs of adder 16 which adds what it receives together. At the output of the adder 16 appears the samples I[k] of the composite signal for which the following holds:

$$I[k]=l[k]\cos\alpha-r[k]\sin\alpha \qquad \text{Eq. 3}$$

The composite samples output by adder 16 are applied to a scale factor determining unit 44 and to a divider 43. In a scale factor determining unit 44, the amplitude of the largest sample in the signal block of the q samples I[1] to I[q] is determined. This amplitude becomes the scale factor $SF_{lr}$. In the divider 43, the samples are divided by this scale factor. In the manner already described with respect to FIG. 2, the samples are then quantized in a quantizer 18 and the quantized samples are presented to the transmission medium through an input 20.

The output of the unit 40 of FIG. 6a is also coupled to respective first inputs of multipliers 45 and 46. The scale factor $SF_{lr}$ is applied to respective second inputs of the multipliers 45 and 46. The multipliers 45 and 46 multiply the scale factor $SF_{lr}$ by $\cos\alpha$ and $-\sin\alpha$, respectively to obtain scale factors $SF_l$ and $SF_r$ at outputs thereof, respectively. In a customary fashion as already explained with reference to FIG. 2, the scale factors $SF_l$ and $SF_r$ are quantized in quantizers 36 and 37, and then, applied to the transmission medium through inputs 19 and 22.

Figure 6B:
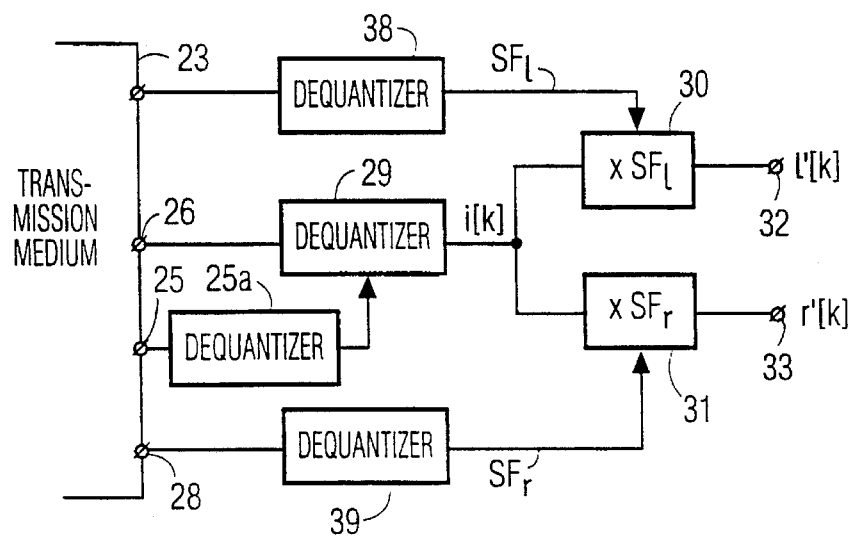

The receiver side, shown in FIG. 6b of a system in accordance with the invention may be identical with the receiver side in FIG. 2b. Hence, further explanation on its operations is not necessary.

Instead of transmitting the scale factors $SF_l$ and $SF_r$, the scale factor $SF_{lr}$ and the angle $\alpha$ could be transmitted. At the receiver end, the scale factors $SF_l$ and $SF_r$ could then be reconstructed from $SF_{lr}$ and $\alpha$. This is diagrammatically shown in FIG. 6c.

Figure 6C:
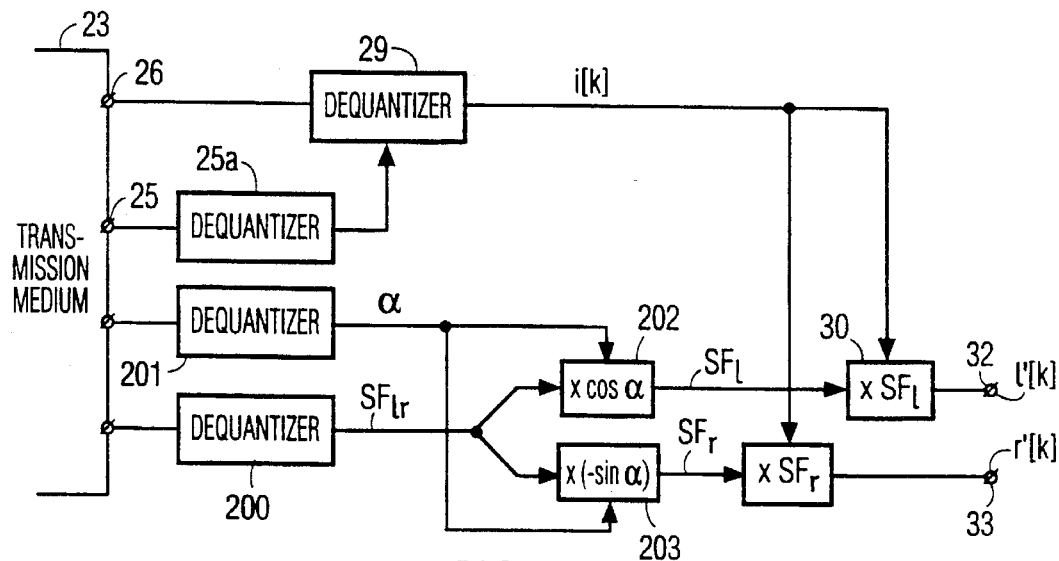

In FIG. 6c the scale factors $SF_l$ and $SF_r$ are first derived from $SF_{lr}$ and $\alpha$ (after they are dequantized in dequantizer 200 and 201 respectively) by using multipliers 202 ($\cos\alpha$) and 203 ($\times(-\sin\alpha)$) respectively, and then multiplied by the composite samples so as to produce the samples in the left and right signal components. Instead, the composite samples could first be multiplied by $SF_{lr}$ in a multiplier 204 at the receiver end, and then the samples obtained could be multiplied by $\cos\alpha$ in a multiplier 205 so as to obtain the left subband signal component and by $-\sin\alpha$ in a multiplier 206 so as to obtain the right subband signal component. This is diagrammatically shown in FIG. 6d.

What follows hereinafter is confirmation that the multipliers 45 and 46 of FIG. 6a produce the scale factors $SF_l$ and $SF_r$ belonging to the respective signal blocks of the original left and right subband signal components.

The transmission medium transmits normalized samples of the composite subband signal which satisfy the following relationship:

$$i[k]=I[k]/SF_{lr}=l[k]\cos\alpha/SF_{lr}-r[k]\sin\alpha/SF_{lr}$$

The coding at the transmitter end is based on the matrix multiplication as represented above. At the receiver end, the inverse matrix multiplication is then performed according to the following relationship:

$$\begin{pmatrix} l'[k] \\ r'[k] \end{pmatrix} = \begin{pmatrix} \cos\alpha & -\sin\alpha \\ -\sin\alpha & \cos\alpha \end{pmatrix} \begin{pmatrix} I[k] \\ 0 \end{pmatrix} \qquad \text{Eq. 4}$$

Figure 6D:
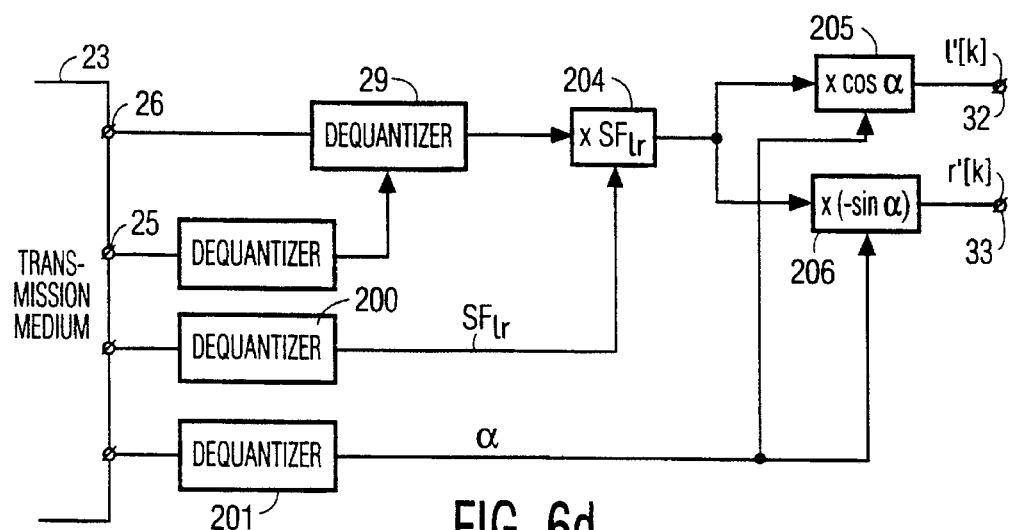

This means for the samples l'[k] at the output 32 of FIGS. 6b–d $$l'[k]=I[k]\cdot\cos\alpha \qquad \text{Eq. 5}$$

$$r'[k]=-I[k]\cdot\sin\alpha$$

In addition, according to the circuits shown in FIGS. 6b–d:

$$l'[k]=i[k]\cdot SF_l=I[k]\cdot SF_l/SF_{lr} \qquad \text{Eq. 6}$$

$$r'[k]=i[k]\cdot SF_r=I[k]\cdot SF_r/SF_{lr}$$

This means that the following is valid: $SF_l=SF_{lr}\cdot(-\sin\alpha)$. Hence, the multipliers 45 and 46 of FIG. 6a really produce the respective values $SF_l$ and $SF_r$.

Figure 7A:
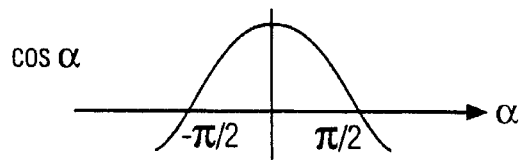
FIGS. 7a and b show the behavior of the scale factors as a function of the rotation angle $\alpha$.
Figure 7B:
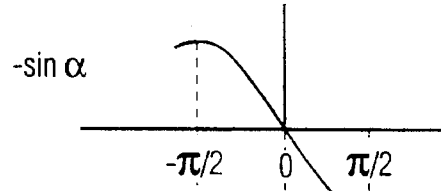

FIGS. 7a and b represent the behavior of $\cos\alpha$ and $\sin\alpha$, respectively, in the region between $-\pi/2$ and $\pi/2$, and, thus, the behavior of the sign of $SF_l$ and $SF_r$. $SF_{lr}$ is always a positive number. This means that $SF_r$ has a negative value if $\alpha$ is situated between 0 and $\pi/2$. This is valid in the cases where the cloud of points (l[k],r[k]) are located in the second and fourth quadrants of the coordinate system shown in FIG. 4c. The result of this is that at least one sign bit for one of the scale factors must be transmitted. The format with which the whole data stream is to be transmitted through the transmission medium must then be taken into consideration. In the Dutch Patent Application No. 90.00.338, such a format is described. The scale factors, however, are coded as positive values and transmitted. For the use of the stereo intensity coding as described hereinbefore, this would imply that an extra bit of, for example, the scale factor $SF_r$ will have to be reserved in the data stream, denoting the sign of the scale factor.

What is explained hereinafter is how it is determined whether a subband can be coded in the stereo intensity mode.

On the basis of psychoacoustic considerations, the stereo intensity mode can only be used for frequencies over about 1500 Hz. For each subband in this frequency range and for each q-sample signal block in the left and right subband signal components, it has to be determined whether this subband can be coded in the stereo intensity mode. Two criterions for that determination now will be discussed.

The first criterion starts from an E[k] which is small relative to the signal energy in the subband concerned. In $$\frac{\sum_{k=1}^{q} E^2[k]}{\sum_{k=1}^{q} (E^2[k] + I^2[k])} \leq D, \qquad \text{Eq. 7}$$

that case a subband is coded in the stereo intensity mode if where D is an arbitrary threshold. If this criterion is compared with the situations shown in FIGS. 4a–c, it appears that in all the cases that satisfy this criterion, the cloud of points (l[k],r[k]) has a cigar-like shape. Consequently, after the rotation transformation, the magnitudes E[k] are small. In these cases, a stereo intensity coding is permissible. However, if the cloud of points are more circular, a stereo intensity coding would not be permitted.

According to a second criterion, masking is utilized. The power of the error occurring by omitting the samples E[k] for the left channel is given by the following relationship:

$$\frac{\sin^2(\alpha)}{q} \sum_{k=1}^{q} E^2[k], \qquad \text{Eq. 8a}$$

and for the right channel by the following relationship:

$$\frac{\sin^2(\alpha)}{q} \sum_{k=1}^{q} E^2[k], \qquad \text{Eq. 8b}$$

This omission is permitted if the error in the two channels is masked. For a further description of the function masking, reference is made to articles by G. Theile et al entitled "Low bit rate coding of high-quality signals. An introduction to the MUSICAM System" found in EBU Tech. Review No. 230 in Aug. 1988 and R. N. J. Veldhuis et al., entitled "Subband coding of digital audio signals" found in Philips Journal of Research 329–391 in 1989; European Patent Application No. 289,080 and Dutch Patent Application Nos. 90.01.127 and 90.01.128.

As observed above, in the exemplary embodiment of the system according to the invention discussed above, at least one sign bit for a scale factor is to be transmitted via the transmission medium. An exemplary embodiment is discussed hereinafter which renders transmitting the sign bit redundant, and as a result provides a better transmission than is realized with the prior-art system shown in FIG. 2. This exemplary embodiment is based on the system shown in FIG. 6a in which an adaptation is realized in the unit 40.

Figure 9:
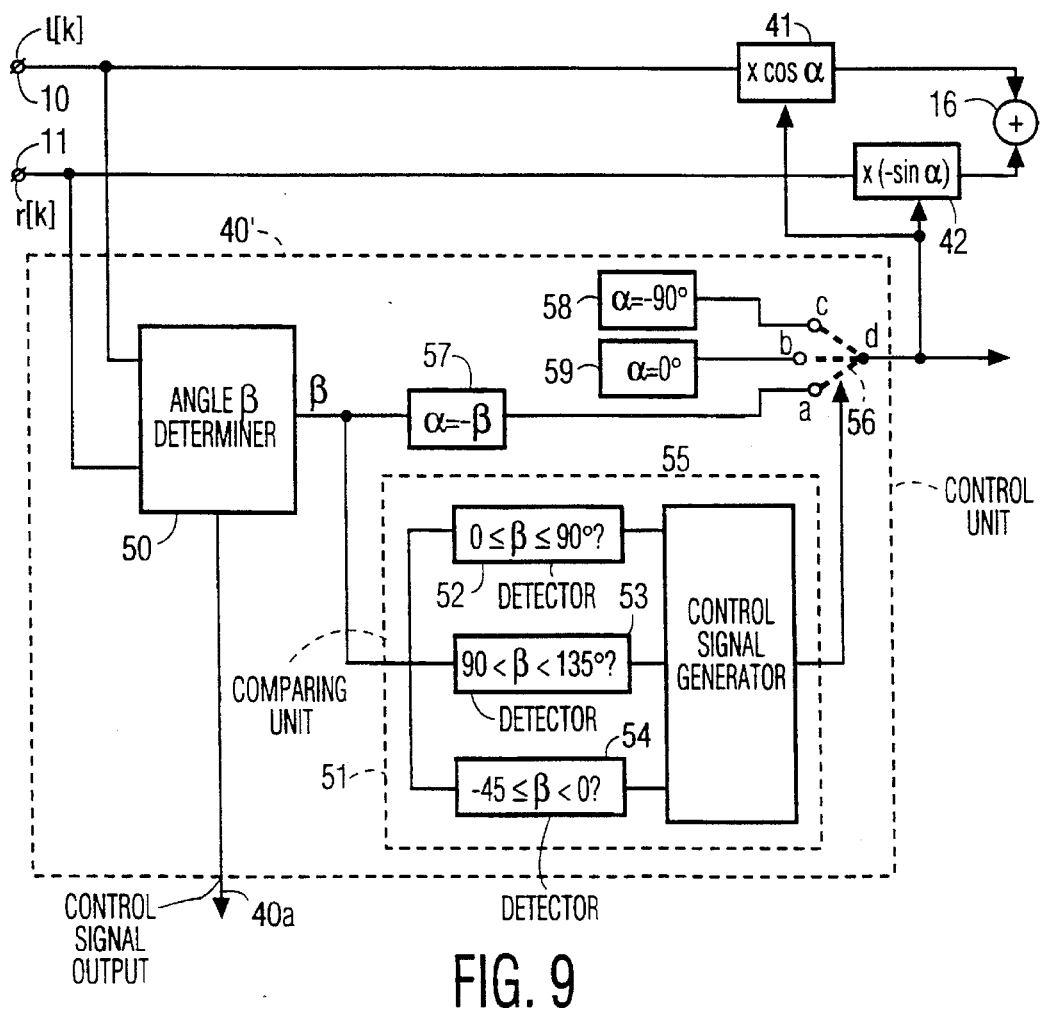
FIG. 9 shows a section of the coding system shown in FIG. 1 which is capable of producing the results shown in FIG. 8 for an embodiment of the stereo intensity in accordance with the invention.

In FIG. 9, the section of the system shown in FIG. 6a located between the inputs 10 and 11 and the adder is shown. The control unit 40 of FIG. 6a is shown in more detail in FIG. 9 and is referenced by the reference numeral 40'. The control unit 40' comprises an angle determiner 50 which first determines whether stereo intensity coding of a subband should be preformed in the manner described above. If so, it generates a control signal which causing stereo intensity coding to occur and determines the angle $\beta$ of the projection lines I—I, I'—I' and I"—I" in FIGS. 4a, 4b and 4c in the manner described above. In a comparing unit 51, a detector 52 detects whether $\beta$ is situated between 0 and 90°. If this is the case, the detector 52 applies a detection signal to a control signal generator 55. A detector 53 in the comparing unit 51 detects whether $\beta$ is situated between 90 and 135°. If this is the case, the detector 53 applies a detection signal to the generator 55. A detector 54 detects whether $\beta$ is situated between −45° and 0°. If this is the case, the detector 54 applies a detection signal to the generator 55. In response to the detection signal applied by the detector 52, 53 or 54 to the generator 55, the generator 55 produces first, second or third control signals, respectively, to be applied to a control signal input of a controllable switch 56.

Figure 8:
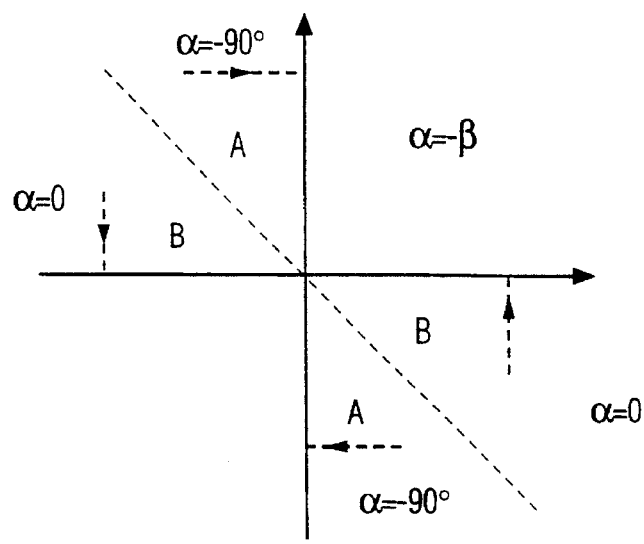
FIG. 8 shows graphically certain results of another embodiment of the stereo intensity coding according to the invention depending upon where points corresponding to respective pairs of time-equivalent samples in respective first and second signal blocks of respective first and second subband signals in a subband are located in that graph.

In response to the first control signal (i.e., the one indicating that $\beta$ is between 0° and 90°), the switch 56 connects terminals a and d. This means that a value of $\alpha$ equal to $-\beta$ appears at the output of the control unit 40', see unit 57 in the control unit 40' where $\alpha$ is equal to $-\beta$. The first control signal in fact characterizes the situation in which the cloud of points (l[k],r[k]) is essentially located in the first and third quadrants of the l–r coordinate system. This is shown in FIG. 8 by the equation $\alpha=-\beta$ in the first quadrant. In this situation, the coding is performed as discussed with respect to the system shown in FIG. 6a.

In response to the second control signal (i.e., the one indicating that $\beta$ is between 90° and 135°), the switch 56 connects terminals c and d. In this case, unit 58 in the control unit 40' is coupled to the output of the unit 40' and a value of $\alpha$ equal to −90° appears at this output. The second control signal characterizes the situation in which a cloud of points (l[k],r[k]) is essentially located in the parts of the plane in FIG. 8 denoted by the letters A. Because $\alpha$ in this case is equal to −90°, coding of these points is performed by way of a projection on the r-axis, and only these projections are transmitted via the transmission medium as the samples of the composite subband signal. This is apparent in FIG. 9 because samples I[k] for which:

$$I[k]=r[k] \qquad \text{Eq. 9a}$$

appear at the output of the adder 16, after multiplication in the multipliers 41 and 42 and addition in the adder 16.

Another way of looking at what happens here, which is more in the line of the description given with respect to FIGS. 4 and 5, is that the cloud of points is rotated through 90°, and the projections are performed on the l-axis. These projections are then transmitted.

FIG. 8 shows that this coding produces a better transmission than the coding described for the system shown in FIG. 2. The projection on the r-axis shown in FIG. 8 produces a better approximate of the original samples than the projection on the line I—I in FIG. 3.

In response to the third control signal (i.e., the one indicating that β is between −45° and 0°), the switch 56 connects terminals b and d. In this case, unit 59 in the control unit 40' is coupled to the output of the control unit 40' and a value of α equal to 0° appears at this output. The third control signal characterizes a situation in which the cloud of points (l[k],r[k]) is essentially located in the parts of the plane shown in FIG. 8 denoted by the letters B. Because α in this case is equal to 0°, coding of these points is performed by way of a projection on the l-axis, and only these projections are transmitted via the transmission medium as samples of the composite subband signal. This is apparent from FIG. 9 because, after the multiplication in the multipliers 41 and 42 and addition in the adder 16, samples I[k] appear at the output of the adder 16 for which:

$$I[k]=l[k] \qquad \text{Eq. 9b}$$

FIG. 8 shows that this coding produces a better transmission than the coding described with respect to the system shown in FIG. 2. The projection on the l-axis as shown in FIG. 8 produces a better approximate of the original samples than the projections on the line I—I in FIG. 3.

If the samples are coded in the fashion described with reference to FIGS. 8 and 9, no special adaptations are needed at the receiver end. The receiver may, therefore, look just like anyone of the receivers shown in FIGS. 6b–d.

A method for determining the scale factors $SF_l$ and $SF_r$ which can be used in the system according to the invention as discussed above, and also in systems according to the state of the art which are capable of applying a stereo intensity mode coding to the left and right subband signal components in a subband, is described hereinafter. This method of determination is based on the requirement that the reconstructed signal at the receiver end is to have the same power as the original signal. This implies that the following holds true:

$$\sum_{k=1}^{q} l[k]^2 = \sum_{k=1}^{q} r[k]^2 = \sum_{k=1}^{q} SF_l^2 \cdot i[k]^2, \qquad \text{Eq. 10}$$

and thus:

$$SF_l = \sqrt{\sum_{k=1}^{q}(l[k])^2 / \sum_{k=1}^{q}(i[k])^2} \qquad \text{Eq. 11a}$$

Similarly, for $SF_r$ $$SF_r = \sqrt{\sum_{k=1}^{q}(l[k])^2 / \sum_{k=1}^{q}(i[k])^2} \qquad \text{Eq. 11b}$$

Figure 10:
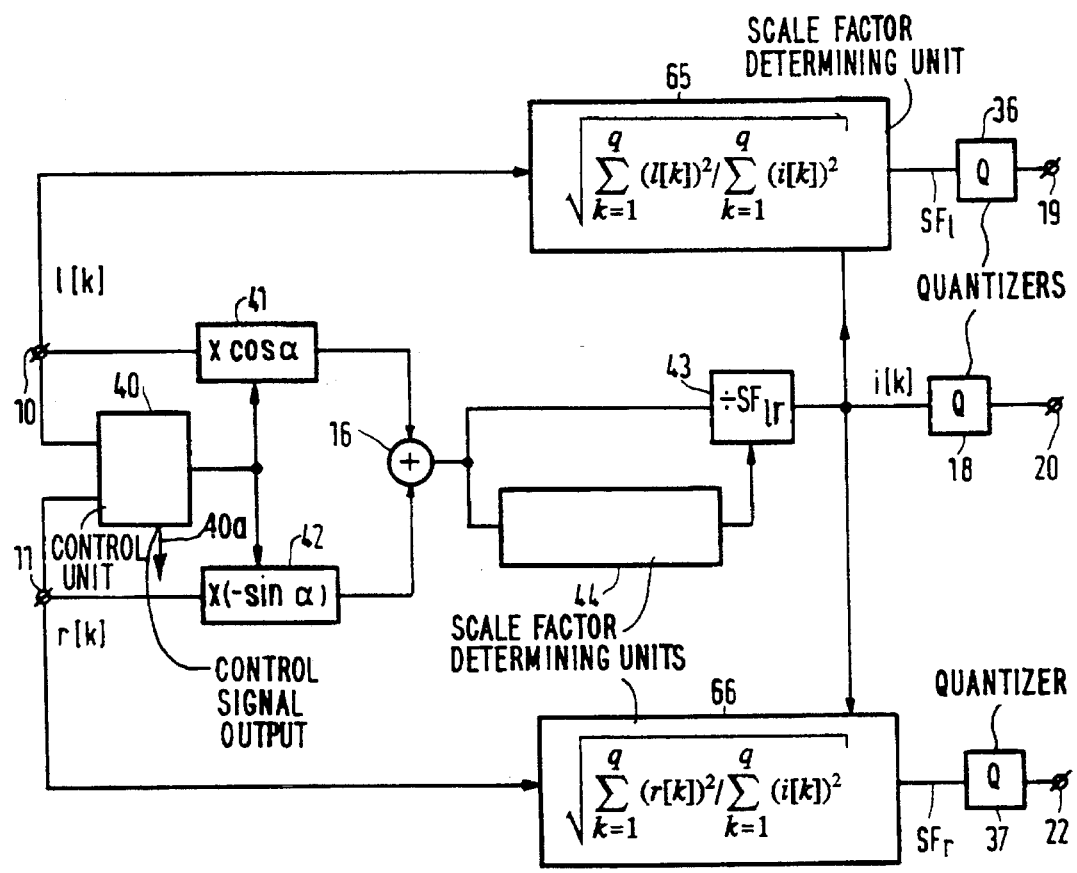
FIG. 10 shows another embodiment of the section of the coding system shown in FIG. 1 which is capable of performing the stereo intensity code according to the invention.

FIG. 10 shows this method implemented in a transmitter according to the invention. FIG. 10 shows only the relevant transmitter section of the system shown in FIG. 6a. In FIG. 6a, the scale factors were determined in the scale factor determining units 45 and 46. These scale factor determining units are omitted in the exemplary embodiment of FIG. 10 and replaced by the scale factor determining units 65 and 66.

A first input of the scale factor determining unit 65 is coupled to an input terminal 10 through which the scale factor determining unit 65 is supplied with the samples l[1] to l[q] in a signal block. A second input to unit 65 is coupled to the output of a divider 43 so that the scale factor determining unit 65 is supplied with composite samples i[1] to i[q] through that second input. The scale factor determining unit 65 is capable of computing the scale factor $SF_l$ from these input signals with the aid of Eq. 11a.

A first input of the scale factor determining unit 66 is coupled to the input terminal 11 and a second input thereof is coupled to the output of the divider 43. The scale factor determining unit 66 computes the scale factor $SF_r$ on the basis of the signals supplied through these inputs with the aid of Eq. 11b.

This method is also implemented in a system (shown in FIG. 11) according to the invention such as the one described, for example, in conjunction with FIG. 6a or 10. However, it should be observed in this respect that this correction may also be used in systems according to the state of the art which are capable of applying a stereo intensity mode coding to the left and right subband signal components of a subband.

It may happen as a result of quantization in quantizer 36 that the quantized scale factor $SF_l$ has a value slightly deviating from the real value for the scale factor. This can be represented as follows:

$$SF'_l=(1+\gamma) \cdot SF_l \qquad \text{, Eq. 12}$$

where $SF'_l$ is the value of the quantized scale factor $SF_l$. As a result, the power of the left subband signal component in a subband at the receiver end is changed by a factor of $(1+\gamma)^2$. Since one wishes to fulfil a requirement that the power of the left subband signal component in a subband at the transmitter and receiver ends are the same, the samples i[k] at the transmitter end are first to be divided by $(1+\gamma)$.

Figure 11:
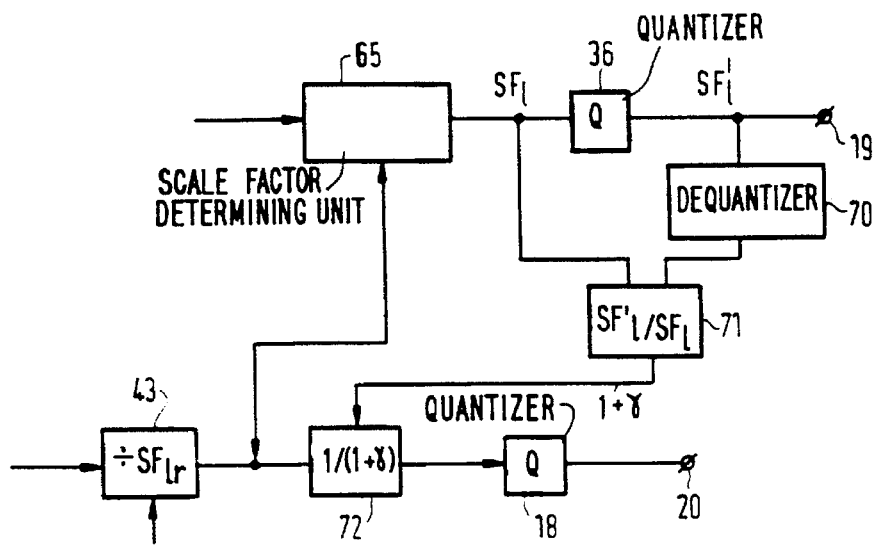
FIGS. 11 and 12 show embodiments capable of correcting scale factor quantization errors in accordance with the invention, a detail of another exemplary embodiment.

The relevant section of a system which is capable of making corrections for the value of the quantized scale factor $SF_l$ is represented in FIG. 11. For this application, at least one sign bit for one of the scale factors is to be determined as described hereinbefore with reference to FIG. 6a. This sign bit may then be added to the associated scale factors after which transmission may be effected. The output of a quantizer 36 is coupled to the input of a dequantizer 70 in which the quantized scale factor $SF_l$ is again dequantized. The dequantizer produces a value $SF'_l$ of the quantized scale factor $SF_l$. The outputs of the dequantizer 70 and the quantizer 36 are coupled to inputs of a divider 71 in which a division of $SF'_l/SF_l$ is performed for obtaining the value 1+. This value is applied to a divider 72 which is inserted between a divider 43 and a quantizer 18. In the divider 72, the samples i[k] are divided by the value 1+γ. In this fashion, compensation is made for the quantizing error resulting from the quantization of the scale factor $SF_l$. As a result of this correction, the power in the left subband signal component in a subband remains constant.

In the right subband signal component in a subband an error has developed in the power, which error, expressed in dB, is equal to the maximum quantization step size (in dB) in the scale factors. Compensation for the quantization error, which error occurs as a result of the quantization of the scale factor $SF_r$, could naturally be made in the manner as described above for the left subband signal component in a subband. This again would means that an error is developed in the transmitted left subband signal component in the subband.

Figure 12:
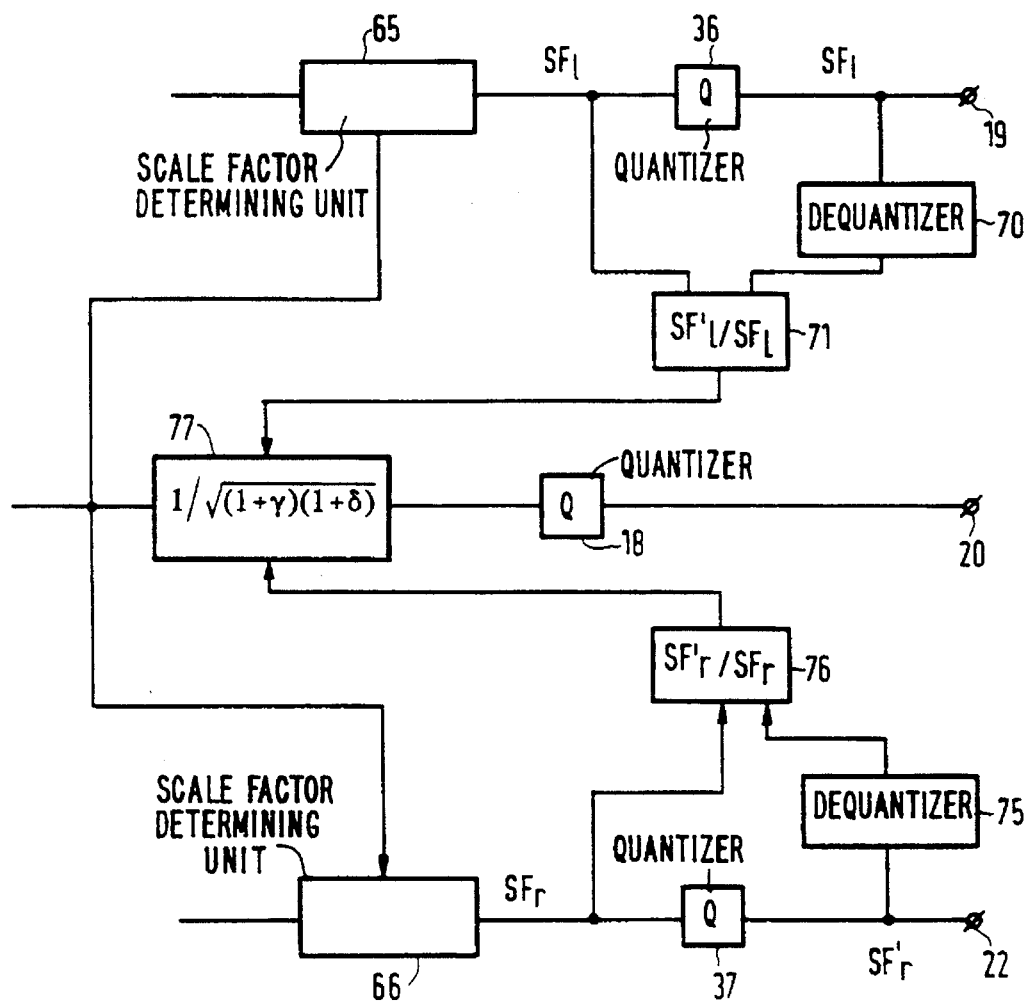

FIG. 12 shows an exemplary embodiment in which the quantization error in $SF_l$ as well as the quantization error in $SF_r$ are both taken into consideration. The system shown in FIG. 12 comprises a dequantizer 75, a divider 76 and a divider 77. In the divider 76, the value $(1+\delta)$ is determined for which:

$$(1+\delta)=SF'_r/SF_r \qquad \text{Eq. 13}$$

In the divider 77, the samples [k] are then divided by the value $$\sqrt{1+\gamma)(1+\delta)} \qquad \text{Eq. 14}$$

In this case, a compromise is reached so that corrections are made at least partly for the quantization errors in the scale factors in both the left and right subband signal components in a subband. This measure is also applicable to the aforementioned state-of-the-art systems.

A further possibility for this error correction would be to detect for each signal block of the left subband signal component and the time-equivalent signal block of the right subband signal component in a subband which of the two signal blocks is louder, and correct the scale factor belonging to the subband signal component which is the louder in accordance with the method shown in FIG. 11. More generally, this means that the correction factor in the unit 77 is a function of the values $(1+\gamma)$ and $(1+\delta)$, which function may then further be determined by the value of the scale factors and/or the energies of the two subband signal components. A more general relationship for the correction factor can be explained as:

$$\{(1+\gamma)^L(1+\delta)^R\}^{1/(L+R)}, \qquad \text{Eq. 15}$$

where L and R stand for either $SF_l$ and $SF_r$, or for the energies in the left and right subband signal components, respectively. It is clear that for L=R, this relationship can be simplified to Eq. 14 for the correction factor.

Figure 13:
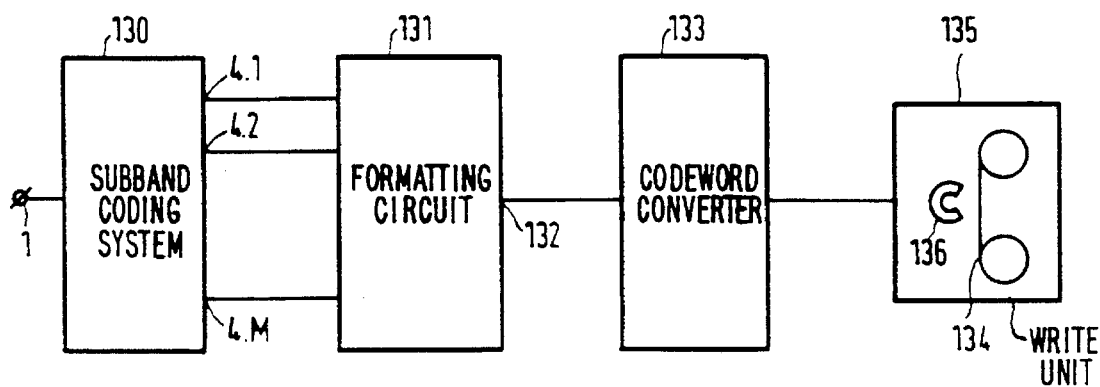
FIG. 13 shows the use of the coding system in a transmitter in the form of a recording device for recording quantized subband signals on a magnetic record carrier.

FIG. 13 shows the use of the subband coding system as described hereinbefore, in a transmitter, more particularly, a transmitter in the form of a recording device for recording the quantized subband signals in one or more tracks on a magnetic record carrier. The section referenced 130 is the subband coding system presenting the quantized subband signals at the outputs 4.1 to 4.M.

For each subband m, the left and right subband signal components are processed separately, the output 4.m should be considered as two separate outputs at which the quantized left and right subband signal components in subband m are presented. Alternatively, it is possible for the q quantized samples in two time-equivalent signal blocks or the left and right subband signal components in the subband m to be presented consecutively at the output 4.m.

When the subband m is processed in the stereo intensity mode, the quantized composite subband signal is presented at output 4.m. Furthermore, two quantized scale factors $SF'_l$ and $SF'_r$ for each subband signal component are presented at an output of the section 130. Allocation information for each subband is likewise presented at an output of the section 130. For a subband m, for which the left and right second subband signal components are processed separately, the allocation information is generated for each subband signal component (i.e., $n_{ml}$ and $n_{mr}$). For a subband m processed in the stereo intensity mode, only the allocation information is generated for the quantized composite subband signal (i.e., $n_{mc}$), The section referenced 131 in FIG. 13 is a formatting circuit which converts all of the signals provided by the section reference 130 and includes them in a second digital signal to be presented at an output 132. This second digital signal is made up of successive frames whose format is extensively discussed in Dutch Patent Application No. 90.00.338. Also the section referenced 131 is explained in those documents.

A section referenced 133 in FIG. 13 is a codeword converter which renders the second digital signal suitable for recording on a record carrier, for example, a magnetic record carrier 134. The codeword converter 133 comprises, for example, an 8-to-10 converter. In such a converter, 8-bit data words in a serial information stream are converted to 10-bit codewords. Interleaving may also be effected in the codeword converter 133. The objective of all of this is to provide error correction of the received information possible at the receive end (when the record carrier is reproduced).

The output signal of the codeword converter 133 is applied to write unit 135 by which the signal provided thereby is recorded in one or more longitudinal tracks on the record carrier 134. The write unit 135 comprises one or more write heads 136.

For a further explanation of the system shown in FIG. 13 reference is made to European Patent Application No. 90.00.635.

It should further be noted that the invention described herein is not restricted to only the exemplary embodiments shown and discussed herein. Various modifications of the exemplary embodiments are possible without deviating from the invention as defined in the claims.

We claim:

1. A coding system for coding a digital signal having a first-signal component and a second signal component, the coding system comprising:

subband coding means for generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

control means for:

(a) processing the first and second signal blocks to obtain a minimum distance value representative of a distance between a line and a plurality of points if (i) the points correspond to the respective pairs of time-equivalent samples in the first signal block and the second signal block, and are plotted in a coordinate system having a first axis and a second axis intersecting at an origin such that each of the points has a location along the first axis dictated by the sample from the first signal block for that point and at a location along the second axis dictated by the sample from the second signal block for that point, and (ii) the line is plotted such that it traverses the origin and the points at a minimum distance from the points in the coordinate system; and (b) when the minimum distance value is less than or equal to a threshold distance value, (i) generating a control signal and (ii) determining a value $\beta$ which is representative of an angle formed between the line and the first axis if the points and the line are plotted;

quantizing means for quantizing, when the control signal is generated, a composite signal block composed of q samples obtained by adding the respective pairs of time-equivalent samples in the first and second signal blocks together after multiplying each of the samples of the first signal block by $\cos(\alpha)$ and each of the samples of the second signal block by $-\sin(\alpha)$, where $\alpha$ is determined based on $\beta$, each of the q samples in the composite signal block after quantization being represented by $n_c$ bits, where $n_c$ is a variable.

2. The coding system as claimed in claim 1, wherein $\alpha=-\beta$.

3. The coding system as claimed in claim 1, wherein (a) if β satisfies a condition 0°≦β≦90°, α=−β; (b) if β satisfies a condition 90°<β<135°, α=−90°; and (c) if β satisfies a condition −45°<β<0°, α=0°.

4. The coding system as claimed in claim 3, wherein if β=135°, α=−90°.

5. The coding system as claimed in claim 3, wherein if β=−45°, α=0°.

6. The coding system as claimed in claim 1, wherein said quantizing means is further adapted for quantizing, when the control signal is not generated, the first signal block and the second signal block separately, the q samples in the first signal block after quantization each being represented by $n_1$ bits and the q samples in the second signal block after quantization each being represented by $n_2$ bits, where $n_1$ and $n_2$ are variables.

7. The coding system as claimed in claim 1, wherein said minimum distance value is representative of the sum of the squares of the distances between each of the points and the line.

8. The coding system as claimed in claim 1, wherein the coding system further comprises combining means for producing the composite signal block, said combining means comprising:

first multiplying means for multiplying each of the samples of the first signal block by $\cos(\alpha)$;

second multiplying means for multiplying each of the samples of the second signal block by $-\sin(\alpha)$; and summing means for adding the respective pairs of time-equivalent samples in the first and second signal blocks together after multiplying each of the samples of the first signal block by $\cos(\alpha)$ and each of the samples of the second signal block by $-\sin(\alpha)$.

9. The coding system as claimed in claim 1, further comprising scale factor determining means for determining a composite scale factor for the composite signal block, the composite scale factor being determined from a sample therein having a maximum absolute value amplitude.

10. The coding system as claimed in claim 9, wherein said scale factor determining means comprises:

first multiplying means for multiplying the composite scale factor by $\cos(\alpha)$ to obtain a first scale factor for the first signal block; and second multiplying means for multiplying the composite scale factor by $-\sin(\alpha)$ to obtain a second scale factor for the second signal block.

11. The coding system as claimed in claim 9, wherein said scale factor determining means is adapted to determine a scale factor for the first signal block in accordance with the following relationship:

$$SF_{lr}\sqrt{\frac{S_1}{S_c}},$$

where $SF_{lr}$ is the composite scale factor, $S_1$ is the sum of the squares of the amplitudes of the samples in the first signal block and $S_c$ is the sum of the squares of the amplitudes in the composite signal block.

12. The coding system as claimed in claim 9, wherein said scale factor determining means is adapted to determine a scale factor for the second signal block in accordance with the following relationship:

$$SF_{lr}\sqrt{\frac{S_2}{S_c}},$$

where $SF_{lr}$ is the composite scale factor, $S_2$ is the sum of the squares of the amplitudes of the samples in the second signal block and $S_c$ is the sum of the squares of the amplitudes in the composite signal block.

13. A transmitter, comprising the coding system as claimed in claim 9, for transmitting the composite signal block, after quantization, scale factor information related to the composite scale factor, and information related to α when the control signal is generated.

14. The transmitter as claimed in claim 13, wherein said quantizing means comprises a dividing means for dividing each of the samples of the composite signal block by the composite scale factor prior to quantizing the composite signal block.

15. A transmitting and receiving system, comprising:

the transmitter claimed in claim 14; and a receiver for receiving the composite signal, the scale factor information and the information related to which have been transmitted, the receiver comprising multiplying means for:

multiplying the composite scale factor by $\cos \alpha$ so as to obtain a scale factor for the first signal block;

multiplying the composite scale factor by $-\sin \alpha$ so as to obtain a scale factor for the second signal block;

multiplying the samples of the composite signal block, after dequantization, by the first scale factor so as to obtain a replica of the first signal block; and multiplying the samples of the composites signal block, after dequantization, by the second scale factor so as to obtain a replica of the second signal block.

16. A transmitting and receiving system, comprising:

the transmitter claimed in claim 14; and a receiver for receiving the composite signal block, the scale factor information and the information related to α which have been transmitted, the receiver comprising multiplying means for:

multiplying the composite scale factor by each of the samples in the composite signal block, after dequantization, to obtain composite scale factor samples;

multiplying each of the composite scale factor samples by $\cos \alpha$ so as to obtain a replica of the first signal block; and multiplying each of the composite scale factor samples by $-\sin \alpha$ so as to obtain a replica of the second signal block.

17. The transmitter as claimed in claim 14, wherein the transmitter is adapted to record the composite signal block, after quantization, the scale factor information and the information related to α in a track on a record carrier when the control signal is generated.

18. A transmitting and receiving system, comprising:

the transmitter claimed in claim 17; and a receiver for receiving the composite signal block, the scale factor information and the information related to α from the track, the receiver comprising multiplying means for:

multiplying the composite scale factor by $\cos \alpha$ so as to obtain a scale factor for the first signal block;

multiplying the composite scale factor by $-\sin \alpha$ so as to obtain a scale factor for the second signal block;

multiplying the samples of the composite signal block, after dequantization, by the first scale factor so as to obtain a replica of the first signal block; and multiplying the samples of the composites signal block, after dequantization, by the second scale factor so as to obtain a replica of the second signal block.

19. A transmitting and receiving system, comprising:
the transmitter claimed in claim 17; and
a receiver for receiving the composite signal block, scale factor information and the information related to α from the track, the receiver comprising multiplying means for:
multiplying the composite scale factor by each of the samples in the composite signal block, after dequantization, to obtain composite scale factor samples;
multiplying each of the composite scale factor samples by cos α so as to obtain a replica of the first signal block; and
multiplying each of the composite scale factor samples by −sin α so as to obtain a replica of the second signal block.

20. The coding system as claimed in claim 1, further comprising scale factor determining means for determining a first scale factor for the first signal block and a second scale factor for the second signal block.

21. The coding system as claimed in claim 20, wherein said scale factor determining means comprises:
second quantizing means for quantizing the first scale factor;
dequantizing means for dequantizing the first scale factor to obtain a dequantized first scale factor; and
dividing means for dividing the dequantized first scale factor by the first scale factor to obtain a coefficient based thereon; and said quantizing means comprises multiplying means for multiplying each of the samples of the composite signal block by the coefficient.

22. The coding system as claimed in claim 21, wherein the coefficient is equal to $SF_1/SF'_1$, where $SF_1$ is the first scale factor and $SF'_1$ is the first scale factor after quantization.

23. The coding system as claimed in claim 21, wherein said scale factor determining means is further adapted to determine a composite scale factor for the composite signal block, the composite scale factor being determined from a sample therein having a maximum absolute value amplitude; and said quantizing means further comprising dividing means for dividing each of the samples of the composite signal block by the composite scale factor.

24. The coding system as claimed in claim 20, wherein said scale factor determining means comprises:
second quantizing means for quantizing the second scale factor;
dequantizing means for dequantizing the second scale factor to obtain a dequantized second scale factor; and
dividing means for dividing the dequantized second scale factor by the second scale factor to obtain a coefficient based thereon; and
said quantizing means comprises multiplying means for multiplying each of the samples of the composite signal block by the coefficient.

25. The coding system as claimed in claim 24, wherein the coefficient is equal to $SF_2/SF'_2$, where $SF_2$ is the second scale factor and $SF'_2$ is the second scale factor after quantization.

26. The coding system as claimed in claim 24, wherein said scale factor determining means is further adapted to determine a composite scale factor for the composite signal block, the composite scale factor being determined from a sample therein having a maximum absolute value amplitude;
and said quantizing means further comprising dividing means for dividing each of the samples of the composite signal block by the composite scale factor.

27. The coding system as claimed in claim 20, wherein said scale factor determining means comprises
second quantizing means for quantizing (a) the first scale factor and (b) the second scale factor;
dequantizing means for dequantizing (a) the first scale factor to obtain a dequantized first scale factor and (b) the second scale factor to obtain a dequantized second scale factor; and
dividing means for dividing (a) the dequantized first scale factor by the first scale factor to obtain a first coefficient based thereon and (b) the dequantized second scale factor by the second scale factor to obtain a second coefficient thereon; and
said quantizing means comprises multiplying means for multiplying each of the samples of the composite signal block by the first and second coefficients.

28. The coding system as claimed in claim 27, wherein the coefficient is equal to $$\sqrt{(SF_1/SF'_1)(SF_2/SF'_2)} \quad ,$$

where $SF_1$ is the first scale factor, $SF'_1$ is the first scale factor after quantization, $SF_2$ is the second scale factor and $SF'_2$ is the second scale factor after quantization.

29. The coding system as claimed in claim 27, wherein said scale factor determining means is further adapted to determine a composite scale factor for the composite signal block, the composite scale factor being determined from a sample therein having a maximum absolute value amplitude; and said quantizing means further comprising dividing means for dividing each of the samples of the composite signal block by the composite scale factor.

30. A transmitter, comprising the coding system as claimed in claim 20, for transmitting the composite signal block, after quantization, scale factor information related to the first and second scale factors, and at least one sign bit for either the first or the second scale factor when the control signal is generated.

31. The transmitter as claimed in claim 30, wherein said quantizing means comprises a dividing means for dividing each of the samples of the composite signal block by the composite scale factor prior to quantizing the composite signal block.

32. A transmitting and receiving system, comprising:
the transmitter claimed in claim 31; and
a receiver for receiving the composite signal block, the scale factor information and the at least one sign bit which have been transmitted, the receiver comprising multiplying means for:
multiplying each of the samples of the composite signal block by the first scale factor so as to obtain a replica of the first signal block; and
multiplying each of the samples of the composite signal block by the second scale factor so as to obtain a replica of the second signal block.

33. The transmitter as claimed in claim 31, wherein the transmitter is adapted to record the composite signal block, after quantization, the scale factor information and the at least one sign bit in a track on a record carrier when the control signal is generated.

34. A transmitting and receiving system, comprising:
the transmitter claimed in claim 33; and
a receiver for receiving the composite signal block, the scale factor information and the at least one sign bit from the track, the receiver comprising multiplying means for:

multiplying each of the samples of the composite signal block by the first scale factor so as to obtain a replica of the first signal block; and multiplying each of the samples of the composite signal block by the second scale factor so as to obtain a replica of the second signal block.

35. A transmitter comprising the coding system as claimed in claim 8.

36. The transmitter as claimed in claim 35, wherein the transmitter is adapted to record the composite signal block, after quantization, in a track on a record carrier when the control signal is generated.

37. The transmitter as claimed in claim 35, wherein the record carrier is a magnetic record carrier.

38. A method for coding a digital signal having a first signal component and a second signal component, the method comprising:

generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

processing the first and second signal blocks to obtain a minimum distance value representative of a distance between a line and a plurality of points if (i) the points correspond to the respective pairs of time-equivalent samples in the first signal block and the second signal block, and are plotted in a coordinate system having a first axis and a second axis intersecting at an origin such that each of the points has a location along the first axis dictated by the sample from the first signal block for that point and at a location along the second axis dictated by the sample from the second signal block for that point, and (ii) the line is plotted such that it traverses the origin and the points at a minimum distance from the points in the coordinate system;

when the minimum distance value is less than or equal to a threshold distance value, (a) generating a control signal and (b) determining a value $\beta$ which is representative of an angle formed between the line and the first axis if the points and the line are plotted; and when the control signal is generated, (a) generating a composite signal block composed of q samples obtained by adding the respective pairs of time-equivalent samples in the first and second signal blocks together after multiplying each of the samples of the first signal block by $\cos(\alpha)$ and each of the samples of the second signal block by $-\sin(\alpha)$, where $\alpha$ is determined based on $\beta$; and (b) quantizing the composite signal block, each of the q samples in the composite signal block after quantization being represented by $n_c$ bits, where $n_c$ is a variable.

39. The method as claimed in claim 38, wherein $\alpha=-\beta$.

40. The method as claimed in claim 38, wherein (a) if $\beta$ satisfies a condition $0°\leq\beta\leq90°$, $\alpha=-\beta$; (b) if $\beta$ satisfies a condition $90°<\beta<135°$, $\alpha=-90°$; and (c) if $\beta$ satisfies a condition $-45°<\beta<0°$, $\alpha=0°$.

41. The method as claimed in claim 38, further comprising determining a composite scale factor for the composite signal block when the control signal is generated, the composite scale factor being determined from a sample therein having a maximum absolute value amplitude.

42. The method as claimed in claim 41, further comprising determining a scale factor for the first and second signal blocks on the basis of the composite scale factor.

43. The method as claimed in claim 38, further comprising determining a first scale factor for the first signal block and a second scale factor for the second signal block.

44. The method as claimed in claim 43, further comprising:

quantizing the first or and second scale factor to obtain a quantized scale factor;

dequantizing the quantized scale factor to obtain a dequantized scale factor;

dividing the dequantized first scale factor by the scale factor which was quantized to obtain a coefficient based thereon; and multiplying each of the samples of the composite signal block by the coefficient.

45. A coding system for coding a digital signal having a first signal component and a second signal component, the coding system comprising:

subband coding means for generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

quantizing means for quantizing a composite signal block composed of q samples obtained by combining the first and second signal blocks together, each of the q samples in the composite signal block after quantization being represented by $n_c$ bits, where $n_c$ is a variable; and scale factor determining means for determining a composite scale factor for the composite signal block, the composite scale factor being determined from a sample therein having a maximum absolute value amplitude.

46. The coding system as claimed in claim 45, wherein said scale factor determining means is further adapted to determine a scale factor for the first signal block or the second signal block in accordance with the following relationship:

$$SF_{lr}\sqrt{\frac{S_{12}}{S_c}},$$

where $SF_{lr}$ is the composite scale factor, $S_{12}$ is the sum of the squares of the amplitudes of the samples in the first signal block or the second signal block, and $S_c$ is the sum of the squares of the amplitudes in the composite signal block.

47. The coding system as claimed in claim 45, wherein said scale factor determining means is further adapted for determining a scale factor for the first signal block or the second signal block; said scale factor determining means comprises:

second quantizing means for quantizing the scale factor;

dequantizing means for dequantizing the scale factor to obtain a dequantized scale factor; and dividing means for dividing the dequantized scale factor by the scale factor to obtain a coefficient based thereon; and said quantizing means comprises multiplying means for multiplying each of the samples of the composite signal block by the coefficient.

48. A coding method for coding a digital signal having a first signal component and a second signal component, the method comprising:

generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

quantizing a composite signal block composed of q samples obtained by combining the first and second signal blocks together, each of the q samples in the composite signal block after quantization being represented by $n_c$ bits, where $n_c$ is a variable; and determining a composite scale factor for the composite signal block, the composite scale factor being determined from a sample therein having a maximum absolute value amplitude.

49. A receiving system, comprising:

receiving means for receiving (a) samples of a composite signal block, where each of the samples is representative of a combination of a pair of respective time-equivalent samples from a first signal block of a first subband signal and a second signal block of a second subband signal, the first and the second subband signals being in a same subband and the first and second signal blocks being time-equivalent; (b) a composite scale factor for the composite signal block; and (c) angle information pertaining to an angle $\alpha$ which is representative of an angle between a line and a first axis if (i) points corresponding to the respective pairs of time-equivalent samples in the first signal block and the second signal block are plotted in a coordinate system having the first axis and a second axis intersecting at an origin such that each of the points has a location along the first axis dictated by the sample from the first signal block for that point and at a location along the second axis dictated by the sample from the second signal block for that point, and (ii) the line is plotted such that it traverses the origin and the points at a minimum distance from the points in the coordinate system; and deriving means for deriving the first and second signal blocks from the samples of the composite signal block, the composite scale factor and $\alpha$.

50. The system as claimed in claim 49, wherein said deriving means comprises:

first multiplying means for multiplying the composite scale factor by cos $\alpha$ so as to obtain a scale factor for the first signal block;

second multiplying means for multiplying the composite scale factor by $-\sin \alpha$ so as to obtain a scale factor for the second signal block;

third multiplying means for multiplying the samples of the composite signal block by the first scale factor so as to obtain a replica of the first signal block; and fourth multiplying means for multiplying the samples of the composites signal block by the second scale factor so as to obtain a replica of the second signal block.

51. The system as claimed in claim 49, wherein said deriving means comprises:

first multiplying means for multiplying the composite scale factor by each of the samples in the composite signal block, after dequantization, to obtain composite scale factor samples;

second multiplying means for multiplying each of the composite scale factor samples by cos $\alpha$ so as to obtain a replica of the first signal block; and third multiplying means for multiplying each of the composite scale factor samples by $-\sin \alpha$ so as to obtain a replica of the second signal block.

52. The system as claimed in claim 49, wherein said receiving means is adapted to receive the samples of the composite signal block, the composite scale factor and $\alpha$ from a track of a record carrier.

53. A coding system for coding a digital signal having a first signal component and a second signal component, the coding system comprising:

subband coding means for generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

composite signal block producing means for producing a composite signal block composed of q samples from the first and second signal blocks, said composite signal block producing means including:

angle determining means for determining a value $\alpha$ on the basis of the first and second signal blocks;

combining means for adding the respective pairs of time-equivalent samples in the first and second signal blocks together after multiplying each of the samples of the first signal block by $\cos(\alpha)$ and each of the samples of the second signal block by $-\sin(\alpha)$; and quantizing means for quantizing the composite signal block, each of the q samples in the composite signal block after quantization being represented by $n_c$ bits, where $n_c$ is a variable.

54. The coding system as claimed in claim 53, wherein said angle determining means comprises a first angle determiner for determining a value $\beta$ and a second angle determiner for determining the value of $\alpha$ on the basis of $\beta$, wherein $\beta$ corresponds to an angle which would exist, in a coordinate system having a first axis and a second axis intersecting at an origin, between the first axis and a line which traverses the origin, if (a) the coordinate system has points correspond to the respective pairs of time-equivalent samples in the first signal block and the second signal block plotted in the coordinate system such that each of the points has a location along the first axis dictated by the sample from the first signal block for that point and at a location along the second axis dictated by the sample from the second signal block for that point, and (b) the line is plotted such that it is located at a minimum distance from the points.

55. A method for coding a digital signal having a first signal component and a second signal component, the coding system comprising:

generating (a) a first subband signal in response to the first signal component, the first subband signal including a first signal block of q samples of that subband signal, where q is a positive integer, and (b) a second subband signal in response to the second signal component, the second subband signal including a second signal block of q samples of that subband signal, the first and the second subband signals being in a same subband and the first and second signal blocks being time-equivalent;

determining a value $\alpha$ on the basis of the first and second signal blocks;

producing a composite signal block composed of q samples from the first and second signal blocks by adding the respective pairs of time-equivalent samples in the first and second signal blocks together after multiplying each of the samples of the first signal block by $\cos(\alpha)$ and each of the samples of the second signal block by $-\sin(\alpha)$; and quantizing the composite signal block, each of the q samples in the composite signal block after quantization being represented by $n_c$ bits, where $n_c$ is a variable.

56. The method as claimed in claim 55, further comprising determining a value $\beta$, where $\beta$ corresponds to an angle which would exist, in a coordinate system having a first axis and a second axis intersecting at an origin, between the first axis and a line which traverses the origin, if (a) the coordinate system has points correspond to the respective pairs of time-equivalent samples in the first signal block and the second signal block plotted in the coordinate system such that each of the points has a location along the first axis dictated by the sample from the first signal block for that point and at a location along the second axis dictated by the sample from the second signal block for that point, and (b) the line is plotted such that it is located at a minimum distance from the points; and wherein $\alpha$ is determined on the basis of $\beta$.

* * * * *